United States Patent
Athiwaratkun et al.

(10) Patent No.: US 12,014,155 B2
(45) Date of Patent: Jun. 18, 2024

(54) CONSTRAINED PREFIX MATCHING FOR GENERATING NEXT TOKEN PREDICTIONS

(71) Applicant: Amazon Technologies, Inc., Seattle, WA (US)

(72) Inventors: Praphruetpong Athiwaratkun, Jersey City, NJ (US); Yuchen Tian, Santa Clara, CA (US); Mingyue Shang, Jersey City, NJ (US); Zijian Wang, San Jose, CA (US); Ramesh M Nallapati, Fremont, CA (US); Parminder Bhatia, Kearny, NJ (US); Andrew Oliver Arnold, New York, NY (US); Bing Xiang, Mount Kisco, NY (US); Sudipta Sengupta, Sammamish, WA (US); Yanitsa Donchev, Kirkland, WA (US); Srinivas Iragavarapu, Redmond, WA (US); Matthew Lee, Elmhurst, NY (US); Vamshidhar Krishnamurthy Dantu, Sunnyvale, CA (US); Atul Deo, Kirkland, WA (US); Ankur Deepak Desai, Redmond, WA (US)

(73) Assignee: Amazon Technologies, Inc., Seattle, WA (US)

( * ) Notice: Subject to any disclaimer, the term of this patent is extended or adjusted under 35 U.S.C. 154(b) by 109 days.

(21) Appl. No.: 17/847,115

(22) Filed: Jun. 22, 2022

(65) Prior Publication Data
US 2023/0418567 A1    Dec. 28, 2023

(51) Int. Cl.
*G06F 8/33* (2018.01)

(52) U.S. Cl.
CPC .................................. *G06F 8/33* (2013.01)

(58) Field of Classification Search
CPC .......... G06F 8/33; G06F 12/04; G06F 40/284; G06F 8/42; G06F 40/205; G06F 21/563
See application file for complete search history.

(56) References Cited

U.S. PATENT DOCUMENTS

| | | | |
|---|---|---|---|
| 9,383,973 | B2 | 7/2016 | Villar et al. |
| 9,928,040 | B2 | 3/2018 | Tarlow |
| 10,235,141 | B2 | 3/2019 | Chacko et al. |
| 10,983,761 | B2 | 4/2021 | Svyatkovskiy |
| 11,137,984 | B1 | 10/2021 | Kats |
| 11,431,472 | B1 | 8/2022 | Frunza |

(Continued)

OTHER PUBLICATIONS

Vincent J. Hellendoorn et al.; Are Deep Neural Networks the Best Choice for Modeling Source Code; ACM; retrieved on Sep. 27, 2023 (Year: 2017).*

(Continued)

*Primary Examiner* — S. Sough
*Assistant Examiner* — Cuong V Luu
(74) *Attorney, Agent, or Firm* — S. Scott Foster; Kowert, Hood, Munyon, Rankin & Goetzel, P.C.

(57) ABSTRACT

Pre-fix matching may constrain the generation of next token predictions. Input text to perform a next token prediction may be received. Multiple tokens may be determined from the input text, including a partial token. From possible tokens, one or more matching possible tokens with the partial token may be identified. Next token predictions may then be filtered using the identified possible tokens in order to ensure that the partial token is matched.

20 Claims, 18 Drawing Sheets

(56) References Cited

U.S. PATENT DOCUMENTS

| | | | |
|---|---|---|---|
| 11,720,804 B2 | 8/2023 | Gupta | |
| 2014/0156693 A1 | 6/2014 | Kritt | |
| 2017/0212829 A1 | 7/2017 | Bales et al. | |
| 2019/0227774 A1 | 7/2019 | Banuelos | |
| 2020/0097261 A1 | 3/2020 | Smith et al. | |
| 2021/0034335 A1 | 2/2021 | Svyatkovskiy | |
| 2021/0357762 A1 | 11/2021 | Clement | |
| 2022/0019914 A1 | 1/2022 | James | |
| 2022/0358286 A1* | 11/2022 | Wilson-Thomas | ... G06F 40/274 |
| 2023/0418566 A1 | 12/2023 | Athiwaratkun | |

OTHER PUBLICATIONS

Zafarhussain et al.; Learning the Structure of Commands by Detecting Random Tokens Using Markov Model; ACM; retrieved on Sep. 27, 2023 (Year: 2023).*

U.S. Appl. No. 17/847,112, filed Jun. 22, 2022, Sathish Arumugam Selvaraj.

U.S. Appl. No. 17/847,113, filed Jun. 22, 2022, Praphruetpong Athiwaratkun.

U.S. Appl. No. 17/847,118, filed Jun. 22, 2022, Zijian Wang.

Ivan Provilkov, et al., "BPE-Dropout: Simple and Effective Subword Regularization," Proceedings of the 58th Annual Meeting of the Association for Computational Linguistics, Jul. 5-10, 2020, pp. 1882-1892.

Take Kudo, "Subword Regularization: Improving Neural Network Translation Models with Multiple Subword Candidates," Proceedings of the 56th Annual Meeting of the Association for Computational Linguistics (Long Papers), Jul. 15-20, 2018, pp. 66-75.

International Search Report and Written Opinion dated Sep. 13, 2023 in PCT/US2023/068822, Amazon Technologies, Inc., pp. 1-12.

Tech a Sip, "How to turn on autocomplete in Eclipse IDE? How to enable code suggestion in Eclipse?", May 26, 2022, Retrieved from the Internet: URL:https://www.youtube.com/watch?v=beg-s9D4loE [retrieved on Aug. 29, 2023].

Pycharm By Jetbrains, "Basic code assistance in PyCharm | Getting started," Apr. 19, 2022, Retrieved from the Internet: URL:https://www.youtube.com/watch?v=MCsDfAsxG-Q [retrieved on Aug. 29, 2023].

* cited by examiner evaluation data set source item 1610 function signature 1612

```
def min_cost(cost, m, n):
``` prompt 1614

```
    """
    Write a function to find the minimum cost path to reach
    (m, n) from (0, 0) for the g
    >>> min_cost([[1, 2, 3], [4, 8, 2], [1, 5, 3]], 2, 2)
    8
    >>> min_cost([[2, 3, 4], [5, 9, 3], [2, 6, 4]], 2, 2)
    12
    >>> min_cost([[3, 4, 5], [6, 10, 4], [3, 7, 5]], 2, 2)
    16
    """
``` function body 1616

```
    m, n = len(cost), len(cost[0])
    dp = [[0 for _ in range(n)] for _ in range(m)]
    for i in range(m):
        for j in range(n):
            dp[i][j] = min(dp[i - 1][j], dp[i][j - 1] + cost[i][j])
    return dp[m - 1][n - 1]
``` test statements 1618

```
METADATA = {}
def check(candidate):
    assert candidate([[1, 2, 3], [4, 8, 2], [1, 5, 3]], 2, 2) == 8
    assert candidate([[2, 3, 4], [5, 9, 3], [2, 6, 4]], 2, 2) == 12
    assert candidate([[3, 4, 5], [6, 10, 4], [3, 7, 5]], 2, 2) == 16
check(min_cost)
```

*FIG. 16A* evaluation data set converted item 1620 prompt 1622

```
/*
 * Write a function to find the minimum cost path to reach (m, n) from (0, 0) for the g
 * >>> min_cost([[1, 2, 3], [4, 8, 2], [1, 5, 3]], 2, 2)
 * 8
 * >>> min_cost([[2, 3, 4], [5, 9, 3], [2, 6, 4]], 2, 2)
 * 12
 * >>> min_cost([[3, 4, 5], [6, 10, 4], [3, 7, 5]], 2, 2)
 * 16
``` function signature 1624

```
class MinCost{
    public static int MinCost (List<List<Integer>> cost, int m, int n){
``` function body 1626

```
        int[][] dp = new int[m + 1][n + 1];
        dp[0][0] = 0;
        for (int i = 1; i < m; i++){
            for (int j = 1; j < n; j++){
                dp[i][j] = dp[i - 1][j] + cost[i][j];
            }
        }
        return dp[m][n];
    }
}
``` test statements 1628

```
class Main {
    public static void main(String[] args) throws Exception {
        if (!(MinCost.MinCost(Arrays.asList(Arrays.asList(1, 2, 3),
      Arrays.asList(4,8,2),Arrays.asList(1,5,3)),2,2)==8)
            throw new java.lang.Exception("Exception -- test case 0 did not
                                            pass");
        }
        if (!(MinCost.MinCost(Arrays.asList(Arrays.asList(2, 3, 4),
      Arrays.asList(5,9,3),Arrays.asList(2,6,4)),2,2)==12)
            throw new java.lang.Exception("Exception -- test case 1 did not
                                            pass");
        }
        if (!(MinCost.MinCost(Arrays.asList(Arrays.asList(3, 4, 5),
      Arrays.asList(6,10,4),Arrays.asList(3,7,5)),2,2)==16)
            throw new java.lang.Exception("Exception -- test case 2 did not
                                            pass");
        }
    }
}
```

CONSTRAINED PREFIX MATCHING FOR GENERATING NEXT TOKEN PREDICTIONS

BACKGROUND

Programming languages offer developers, designers, and other users with the ability to precisely specify the operation of various hardware or software designs for many different applications. Given the wide variety of programming languages, these developers, designers, and other users may encounter or otherwise use code written in a programming language which may be less familiar to the developer. Code development tools offer developers, designers, and other users with different capabilities to improve code performance and identify errors, which may in the exemplary scenario described above, help to overcome a developer's lack of familiarity with a programming language (or an environment in which the programming language is deployed) so that high performing code may still be written.

BRIEF DESCRIPTION OF THE DRAWINGS

FIGS. 16A and 16B illustrate example items of an evaluation data set before and after conversion, according to some embodiments.

While embodiments are described herein by way of example for several embodiments and illustrative drawings, those skilled in the art will recognize that the embodiments are not limited to the embodiments or drawings described. It should be understood, that the drawings and detailed description thereto are not intended to limit embodiments to the particular form disclosed, but on the contrary, the intention is to cover all modifications, equivalents and alternatives falling within the spirit and scope as defined by the appended claims. The headings used herein are for organizational purposes only and are not meant to be used to limit the scope of the description or the claims. As used throughout this application, the word "may" is used in a permissive sense (i.e., meaning having the potential to), rather than the mandatory sense (i.e., meaning must). Similarly, the words "include", "including", and "includes" mean including, but not limited to.

DETAILED DESCRIPTION

Various techniques for code generation and validation for code development are described herein. Sophisticated code development tools may rely upon machine learning powered features to assist in the design and development of new application, systems, or services. In order to truly improve user experience with these features, the speed and quality of machine learning power features may be dependent upon various aspects of their development and implementation. One such machine learning powered feature for code development is code suggestion, which may generate and recommend code to a developer. Techniques that improve the speed and quality of code suggestion powered by machine learning may improve the user experience as well as the quality of the applications, systems, or services produced using the feature.

Figure 1:
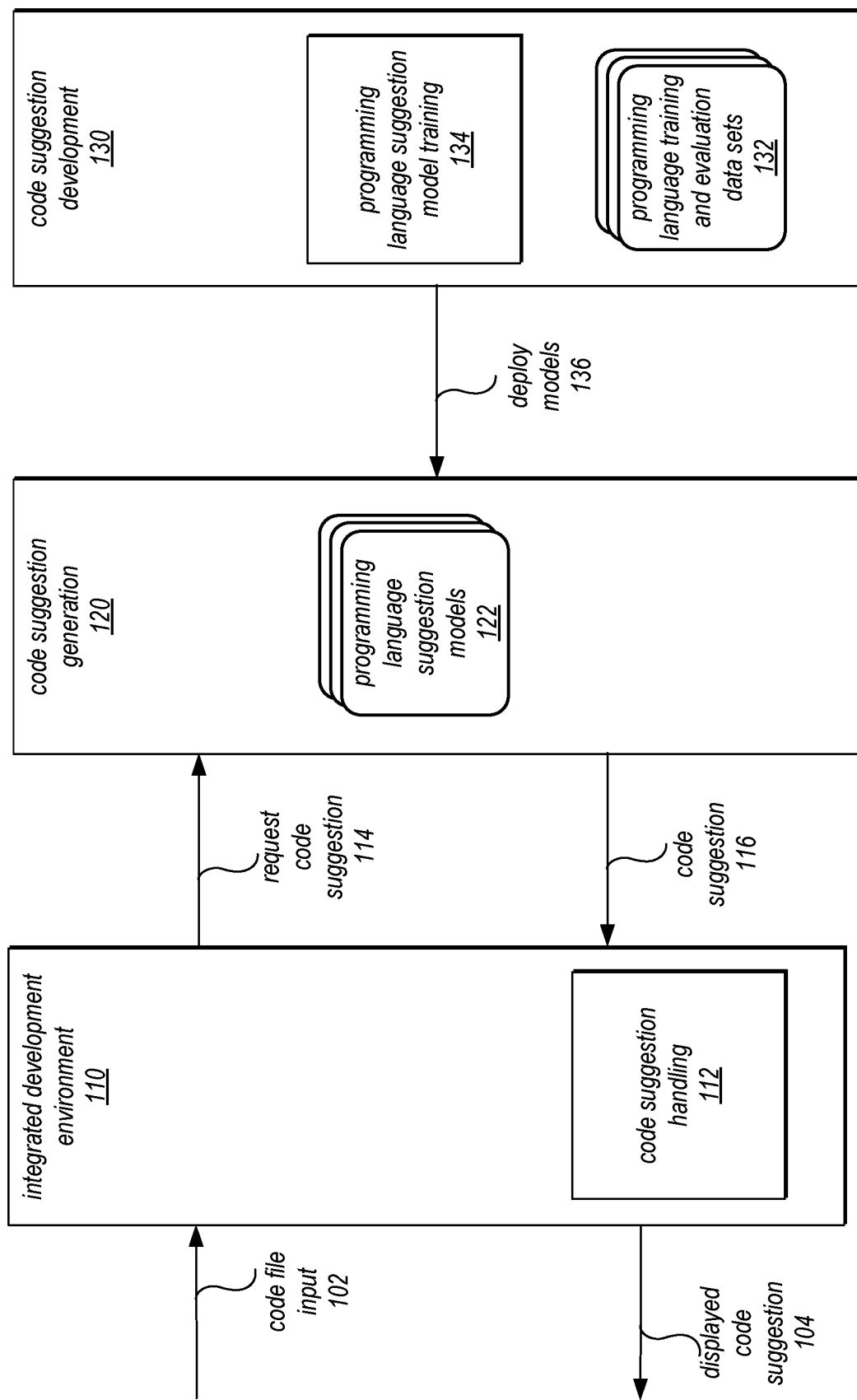
FIG. 1 is a logical block diagram illustrating code generation for code development, according to some embodiments.

FIG. 1 is a logical block diagram illustrating code generation for code development, according to some embodiments. An integrated development environment 110, such as a locally implemented development application on a user device (e.g., computer or laptop) or hosted as part of a provider network service, may make use of code suggestion generation 120 when code file input is received. As discussed in detail below, code suggestion handling 112 may proactively 114 obtain and validate code suggestions 116, as discussed in detail below with regard to FIGS. 3, 4, 8 and 9, before providing them for display 104. In this way, higher latency programming language suggestion models 122 implemented as part of code suggestion generation 120 that offer better and more useable code suggestions 116 can be employed, even if their latency is longer than a smaller, but less accurate model, as the proactive requests can make the apparent latency be at or near 0 for code suggestions while still ensuring through validation that the suggestions are still valid (in light of potentially changing context, such as other code file input 102) before display 104. Other techniques, such as storing and providing paginated results, as discussed below with regard to FIG. 3, may reduce the latency for waiting on code suggestions to display 104 as well.

Other performance improvements to the use and implementation of code suggestion generation 120 may increase the quality and accuracy of suggestions without impacting model performance. For example, constrained pre-fix matching techniques, as discussed in detail below with regard to FIGS. 4, 11 and 12, may improve suggestions in partial word scenarios without increasing the time to produce a suggestion in a meaningful way.

Code suggestion development 130, such as the training 134 and deployment 136 of programming language suggestion models 122 can have improving impacts on code suggestion performance. For example, as discussed in detail below with regard to FIGS. 6, 13 and 14, techniques for modifying training data sets to account and train for subwords may improve code suggestions made in those scenarios. Moreover, the evaluation of code suggestion generation 120 and models 122 may be improved by increased numbers of high quality evaluation data sets 132, which as discussed in detail below with regard to FIGS. 7 and 15-16B, can be programmatically generated from other evaluation data sets.

Please note that previous descriptions are not intended to be limiting, but are merely provided as an example of an integrated development environment, code suggestion generation system, and tools for code suggestion development. Various other embodiments may also implement these techniques, as discussed in detail below.

The specification next includes a general description of a provider network, which may implement a code development service. Then various examples of a code development service are discussed, including different components/modules, or arrangements of components/module that may be employed as part of implementing a code development service in the provider network. A number of different methods and techniques are then discussed, some of which are illustrated in accompanying flowcharts. Finally, a description of an example computing system upon which the various components, modules, systems, devices, and/or nodes may be implemented is provided. Various examples are provided throughout the specification.

Figure 2:
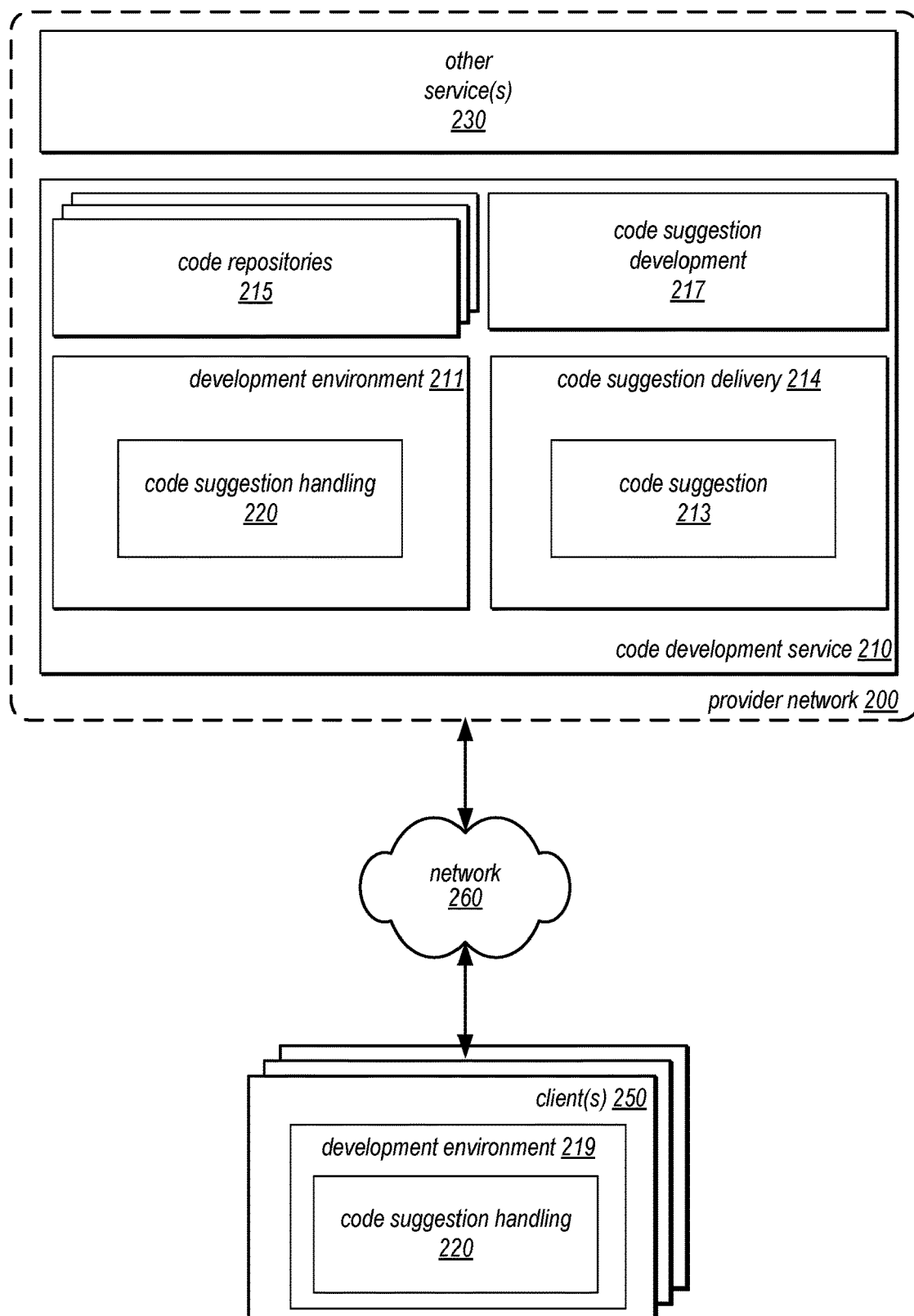
FIG. 2 is a logical block diagram illustrating a provider network that implements different services including a code development service, according to some embodiments.

FIG. 2 is a logical block diagram illustrating a provider network that implements different services including a code development service, according to some embodiments. A provider network 200 (which may, in some implementations, be referred to as a "cloud provider network" or simply as a "cloud") refers to a pool of network-accessible computing resources (such as compute, storage, and networking resources, applications, and services), which may be virtualized or bare-metal. The provider network 200 can provide convenient, on-demand network access to a shared pool of configurable computing resources that can be programmatically provisioned and released in response to customer commands. These resources can be dynamically provisioned and reconfigured to adjust to variable load.

The provider network 200 can be formed as a number of regions, where a region is a separate geographical area in which the cloud provider clusters data centers. Each region can include two or more availability zones connected to one another via a private high speed network, for example a fiber communication connection. An availability zone (also known as an availability domain, or simply a "zone") refers to an isolated failure domain including one or more data center facilities with separate power, separate networking, and separate cooling from those in another availability zone. Preferably, availability zones within a region are positioned far enough away from one other that the same natural disaster should not take more than one availability zone offline at the same time. Customers can connect to availability zones of the provider network 200 via a publicly accessible network (e.g., the Internet, a cellular communication network). Regions are connected to a global network which includes private networking infrastructure (e.g., fiber connections controlled by the cloud provider) connecting each region to at least one other region. The provider network 200 may deliver content from points of presence outside of, but networked with, these regions by way of edge locations and regional edge cache servers. This compartmentalization and geographic distribution of computing hardware enables the provider network 200 to provide low-latency resource access to customers on a global scale with a high degree of fault tolerance and stability.

As noted above, provider network 210 may implement various computing resources or services, such as code development service 210, and other service(s) 230 which may be any other type of network based services, including various other types of storage (e.g., database service or an object storage service), compute, data processing, machine learning, analysis, communication, event handling, visualization, and security services not illustrated).

In various embodiments, the components illustrated in FIG. 2 may be implemented directly within computer hardware, as instructions directly or indirectly executable by computer hardware (e.g., a microprocessor or computer system), or using a combination of these techniques. For example, the components of FIG. 2 may be implemented by a system that includes a number of computing nodes (or simply, nodes), each of which may be similar to the computer system embodiment illustrated in FIG. 17 and described below. In various embodiments, the functionality of a given system or service component (e.g., a component of code development service 210) may be implemented by a particular node or may be distributed across several nodes. In some embodiments, a given node may implement the functionality of more than one service system component (e.g., more than one data store component).

Code development service 210 may be implemented by provider network 200, in some embodiments. Code development service 210 may implement various features for writing code for different systems, applications, or devices, providing features to recommend, identify, review, build, and deploy code. For example, code development service 210 may implement development environment 211. Code development environment 211 may offer various code entry tools (e.g., text, diagram/graphics based application development) to specify, invoke, or otherwise write (or cause to be written) code for different hardware or software applications.

Code development service 210 may implement code suggestion delivery 214 which may implement various computing resources to host and implement code suggestion 213 in a scalable fashion to delivery on-demand code suggestions across large numbers of clients using high-powered machine learning models for high-quality code suggestion results. For example, code suggestion delivery 214 may implement workload balancing and request management features to handle and return code suggestions in a timely manner to provide real-time code suggestions with little or no apparent latency to code suggestion handling 220 (within or without provider network 200).

To avoid making development environments wait on multiple code suggestions to be sent in one communication, in some embodiments, code suggestion delivery 214 may implement pagination features for code suggestions to allow multiple code suggestions to be delivered from hosts or other computing resources implementing code suggestion 213 to recipient development environments 219 and 211 over multiple communications over time. In this way, code suggestions that are valid may be made and presented, and then updated as more are received. Such techniques offer a simulated streaming experience, without actually requiring bi-directional streaming to be supported at development environments. In this way, the benefits of fast delivery and update of code suggestions can be provided without introducing additional requirements onto development environments, which may not necessarily be maintained by the provider network 200 operator.

To implement pagination, code suggestions may be stored in service 210 as they are generated and can then be returned over multiple exchanges by utilizing a pagination token that accompanies the requests for code suggestions in order to allow for the additional code suggestions to be retrieved from storage and sent back to a development environment 219 or 211.

Figure 3:
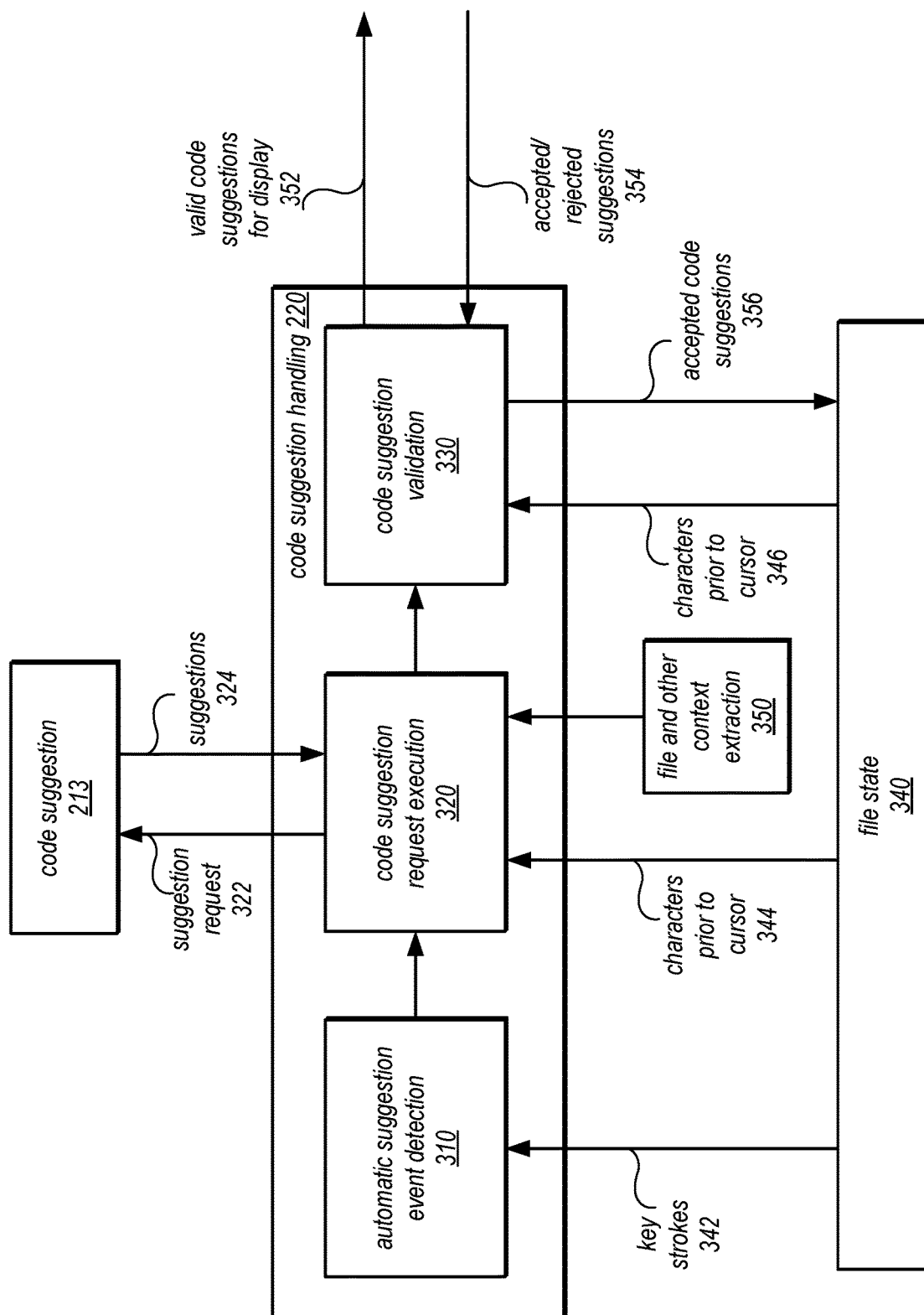
FIG. 3 is a logical block diagram illustrating code suggestion handling, according to some embodiments.

In various embodiments, code suggestion 213 may generate code suggestions based on text input in development environment 211 or 219 (e.g., utilizing a plug-in or other connection which may provide real-time analysis and suggestion of code as the code is entered into the development environment 211 or 219), as discussed in detail below with regard to FIG. 3. Code suggestion 213 may use generative models, machine learning models such as Generative Pre-trained Transformer (GPT), trained to generate code suggestions. Generative models are often trained on a large corpus of data for a specific task. In the case of generating code recommendations, this corpus of (e.g., from code suggestion code repositories 215 or other code repositories used to train the generative model) can be comprised of code repositories or snippets from a variety of sources. Depending on the source or owner, the code may be subject to certain licenses which need to be attributed in any usage or reproduction. Since a generative model can sometimes reproduce verbatim, or close to verbatim, matches to the training data, metadata for attributing the original source may also need to be provided as part of the suggestion. Code suggestion metadata (not illustrated) may provide the ability to provide metadata for code suggestions that may be provided.

Code development service 210 may implement (or have access to) code repositories 215. Code repositories 215 may store various code files, objects, or other code that may be interacted with by various other features of code development service 210 (e.g., development environment 211 to write, build, compile, and/or test code). Code repositories 215 may implement various version and/or other access controls to track and/or maintain consistent versions of collections of code for various development projects, in some embodiments. In some embodiments, code repositories may be stored or implemented external to provider network 200 (e.g., hosted in private networks or other locations).

Code development service 210 may implement an interface to access and/or utilize various features of code development service 210. Such an interface may include various types of interfaces, such as a command line interface, graphical user interface, and/or programmatic interface (e.g., Application Programming Interfaces (APIs)) in order to perform requested operations, including operations of development environment 211. An API refers to an interface and/or communication protocol between a client and a server, such that if the client makes a request in a predefined format, the client should receive a response in a specific format or initiate a defined action. In the cloud provider network context, APIs provide a gateway for customers to access cloud infrastructure by allowing customers to obtain data from or cause actions within the cloud provider network, enabling the development of applications that interact with resources and services hosted in the cloud provider network. APIs can also enable different services of the cloud provider network to exchange data with one another.

Generally speaking, clients 250 may encompass any type of client configurable to submit network-based requests to provider network 200 via network 260, including requests for services (e.g., a request for code search or suggestion, etc.). For example, a given client 250 may include a suitable version of a web browser, or may include a plug-in module or other type of code module that may execute as an extension to or within an execution environment provided by a web browser. Alternatively, a client 250 may encompass an application (or user interface thereof), a media application, an office application or any other application that may make use of resources in provider network 200 to implement various applications. In some embodiments, such an application may include sufficient protocol support (e.g., for a suitable version of Hypertext Transfer Protocol (HTTP)) for generating and processing network-based services requests without necessarily implementing full browser support for all types of network-based data. That is, client 250 may be an application may interact directly with provider network 200. In some embodiments, client 250 may generate network-based services requests according to a Representational State Transfer (REST)-style network-based services architecture, a document- or message-based network-based services architecture, or another suitable network-based services architecture.

In some embodiments, a client 250 may provide access to provider network 200 to other applications in a manner that is transparent to those applications. For example, client 250 may integrate with code development service 210. However, the operating system or file system may present a different storage interface to applications, such as a conventional file system hierarchy of files, directories and/or folders. In such an embodiment, applications may not need to be modified to make use of the storage system service model. Instead, the details of interfacing to the data storage service may be coordinated by client 250 and the operating system or file system on behalf of applications executing within the operating system environment.

Clients 250 may convey network-based services requests to and receive responses from provider network 200 via network 260. In various embodiments, network 260 may encompass any suitable combination of networking hardware and protocols necessary to establish network-based-based communications between clients 250 and provider network 200. For example, network 260 may generally encompass the various telecommunications networks and service providers that collectively implement the Internet. Network 260 may also include private networks such as local area networks (LANs) or wide area networks (WANs) as well as public or private wireless networks. For example, both a given client 250 and provider network 200 may be respectively provisioned within enterprises having their own internal networks. In such an embodiment, network 260 may include the hardware (e.g., modems, routers, switches, load balancers, proxy servers, etc.) and software (e.g., protocol stacks, accounting software, firewall/security software, etc.) necessary to establish a networking link between given client 250 and the Internet as well as between the Internet and provider network 200. It is noted that in some embodiments, clients 250 may communicate with provider network 200 using a private network rather than the public Internet.

In some embodiments, provider network 200 may include the hardware (e.g., modems, routers, switches, load balancers, proxy servers, etc.) and software (e.g., protocol stacks, accounting software, firewall/security software, etc.) necessary to establish a networking links between different components of provider network 200, such as virtualization hosts, control plane components as well as external networks 260 (e.g., the Internet). In some embodiments, provider network 200 may employ an Internet Protocol (IP) tunneling technology to provide an overlay network via which encapsulated packets may be passed through the internal network using tunnels. The IP tunneling technology may provide a mapping and encapsulating system for creating an overlay network and may provide a separate namespace for the overlay layer and the internal network layer. Packets in the overlay layer may be checked against a mapping directory to determine what their tunnel target should be. The IP tunneling technology provides a virtual network topology; the interfaces that are presented to clients 250 may be attached to the overlay network so that when a client 250 provides an IP address that they want to send packets to, the IP address is run in virtual space by communicating with a mapping service that knows where the IP overlay addresses are.

Perceived latency of code suggestions may reduce utilization of code suggestions as a feature. If, for instance, a user has to wait for a detectable period of time after requesting a code suggestion, user workflow can be disrupted. To eliminate perceived latency, code suggestions can be pre-fetched. However, as the input context may have changed since the code suggestion is requested, techniques for validating proactively obtained code completion suggestions may be implemented which ensure that a given recommendation is no longer consistent with the current state of the code. FIG. 3 is a logical block diagram illustrating code suggestion handling, according to some embodiments.

Code suggestion handling 220 may implement automatic suggestion event detection 310 which may evaluate key strokes 342, time elapsed, special keys, or user specific data to detect events. This information may be maintained as part of a user-specific state which may be updated or reset when a code suggestion request is submitted, in various embodiments. For instance, key-strokes, elapsed time, or other measures may be reset. Special keys may also be triggering events (and also may be evaluated in combination with other criteria, such as time elapsed. For example, an event that triggers obtaining a code completion suggestion may include entry of "{" "[" "(" ":" "ENTER KEY" or "TAB KEY" and an elapsed time threshold. In some embodiments, automatic suggestion event detection 310 may use client-specific events, such as the entering of specific keys or characters in a pattern specific to the client (or configured/described by the client in a request to configure suggestion handling 220.

Code suggestion request execution 320 may handle the formation, assembly, sending, and processing of responses from code suggestion 213, including sending requests 322 to obtain code completion suggestions and process returned code suggestions 324. For example, code suggestion request execution 320 may obtain the context window of tokens (e.g., N previous tokens prior to a cursor) from file state 340, as indicated at 344. In some embodiments, file and other context information may be sent, as provided by file and other context extraction 350.

File and other context extraction 350 may utilize different techniques to obtain file and other context information outside of the context window (e.g., outside of N previous tokens). For example, file context may be taken from same file as the code suggestion is being generated for inclusion in. Information that may be obtained for file context may include boundary in the current scope, (e.g., code and comments limited by the current function to provide local context), class-level information, including class declaration, class constructors (e.g., the _init_function), and function level information for all other public or protected methods defined on the class, function-level information, including all functions declared in the current file on both sides of the cursor. In some embodiments, a signature, docstring, and return statement(s) may be extracted and/or variable-level information, including all previous variable declarations, which are visible to the current generation focus.

Other context that may be extracted at 350 may be in-project context. In modern code development, classes and functions are usually defined in hierarchical structured files. Simple backward looking context does not include information outside of the current file, which may cause certain scenarios where machine learning model is not likely to generate the right code. As may code files use imported classes/functions/variables, adding this context may significantly improve code generation performance. Thus, in-project context may be added in some embodiments, where all imported classes, functions, and variables from the same project and used for obtaining a code completion suggestion.

Other context that may be extracted at 350 may be out-of-project context. Out-of-project context may refer to classes/functions/variables imported from other packages into the current file. This is may have suggestion quality impact when the imported packages are under the zero-shot setting, (e.g., when the pretraining model does not have prior knowledge on the packages. Thus, other context may be obtained by scanning out-of-project context for packages not included in pretraining data and including corresponding classes/functions/variables as context in the request.

File and other context extraction 350 may perform regular expression based searches (e.g., for keywords such as "import") and extractions to obtain the various types of context discussed above. In some embodiments, parsing-based extraction may be used (e.g., by generating a symbol tree or other parse graph of the code to obtain the other context information).

Code suggestion request execution 320 may interact with code suggestions provided in paginated form. For example, a response to a request for code suggestions, 324, may include a pagination token indicating that further suggestions may be retrieved. Code suggestion request execution 320 may still proceed to validate and provide the suggestion through code suggestion validation 330 while also submitting a subsequent request 322 with the pagination token to obtain further code suggestion results, which may then be returned, validated, and provided. In this way, multiple suggestions can be made, allowing for different performance times for code suggestions to be generated, including potentially better code suggestions that may be provided while a user is reviewing initial suggestions.

File state 340 may provide information to various stages and may include both the code file and its associated metadata, in some embodiments. File state 340 may also provide information for code suggestion validation 330, such as the current characters prior to a cursor.

Code suggestion validation 330 may validate received code suggestions before providing them for display. For example, code suggestion validation may use one or more validation criteria to determine whether a code suggestion's added characters are a match or near match of the characters prior to the cursor (and added after the time at which the code suggestion request was made). Valid code suggestions may be provided for display, as indicated at 352. In some embodiments, acceptance (or rejection) of these suggestions may be received, as indicated at 354 and passed along to or included in file state 340, as indicated at 356.

Figure 4:
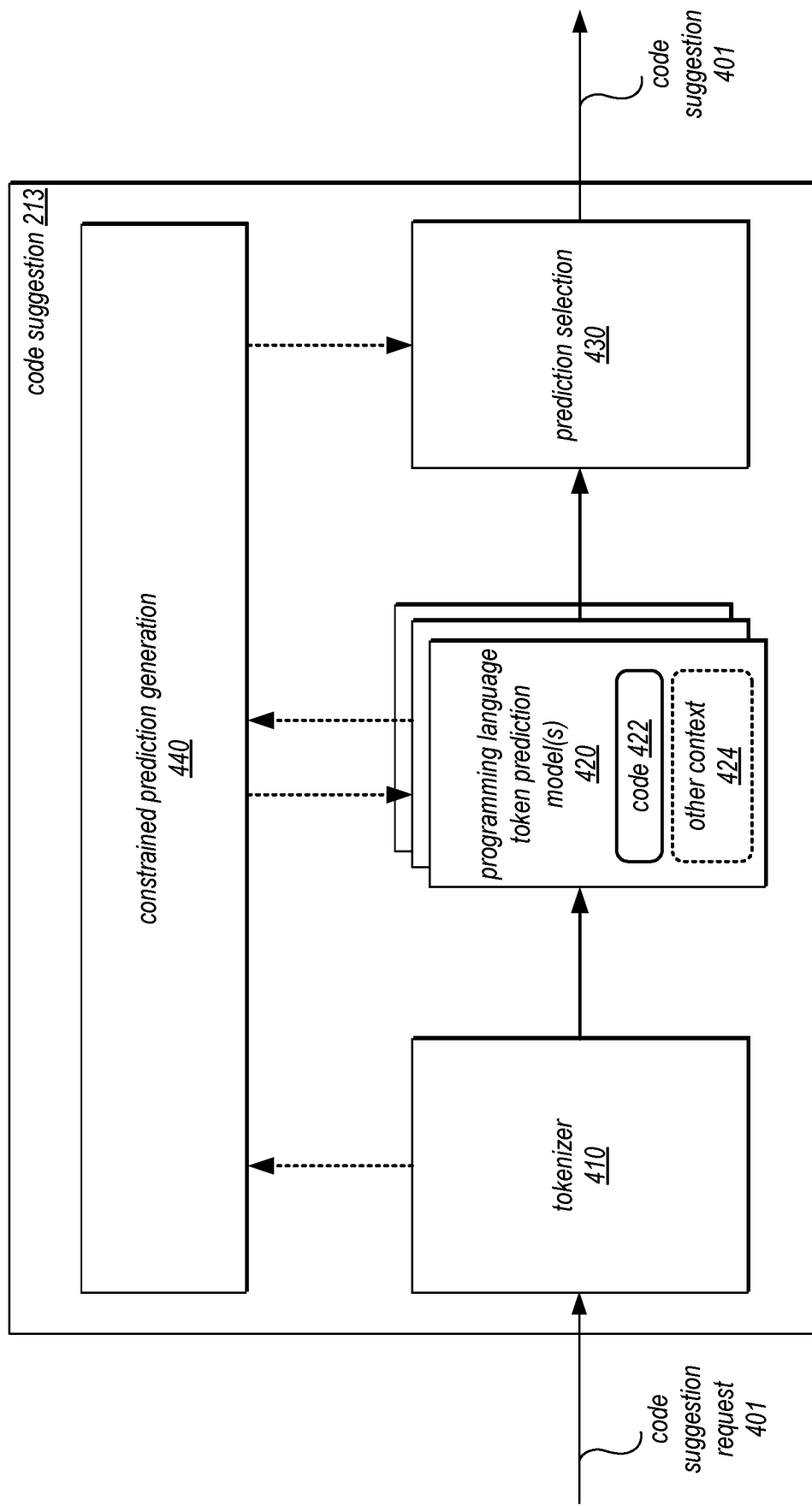
FIG. 4 is a logical block diagram illustrating code suggestion, according to some embodiments.

Code suggestion validation 330 may identify and display 348 valid coded suggestions as well as handle acceptance or rejections of the suggestions, Code suggestion 213 may be implemented to provide various code suggestions in different scenarios. FIG. 4 is a logical block diagram illustrating code suggestion, according to some embodiments. Code suggestion request 401 may be received at tokenizer 410. For example, various different tokenizers or tokenization techniques may be used. Tokens may be individual words in sentences, including the prior space character before the word, "[space]word" as token. Punctuation, empty space, carriage returns, or various other characters may also be grouped or considered individually as tokens.

Programming language token prediction model(s) 420 may use the provided code 422, as well as other context 424 like file context outside of a token window or other files which may be obtained using techniques like regular expression or parsing, as discussed above with regard to FIG. 3. Programming language specified token prediction models 420 may be used (e.g., model A for language A, model B for language B, and so on). Each of them may be trained the code in the respective programming language as well as the other context to produce recommendations. Programming language token prediction models 420 may also be trained on other context information (e.g., same-file, same-project, or other context) as discussed above with regard to FIG. 3.

In some embodiments, code development service 210 may support custom programming language models. For example, training data or code data from a user's specific code repository may be provided for training the custom programming language model, so that it may be used for code suggestions.

The predictions may be provided to selection 430, which may select one based on confidence scores to provide as the code suggestion. In some embodiments, multiple predictions may be provided in paginated or other multi-result forms, as discussed above with regard to FIG. 3.

One scenario that can occur machine learning models that generate text recommendations is when the input has a partial word such as "Syst". In these scenarios, machine learning models tend to provide poor predictions and thus poor suggestions (e.g., generating gibberish or incoherent generations). This happens because the model only sees word tokens as input units. To overcome this scenario, backtracking to the last complete tokens and constraining the generation to match with the prompt suffix which is "Syst" here. Constraining the generation, as discussed below, helps improving accuracy on sub-word data metrics without compromising gains on generic evaluation sets.

Given a string prompt, the incoherence from normal decoding can be caused by the suffix of that prompt which can occur potentially with a sub-word that is not a complete token. Matching of the input string suffix may be performed with all available tokens that start with that suffix or that the suffix starts with. In some embodiments, the matching is done efficiently using a character-trie data structure (e.g., with native Pytorch arrays as node lists for fast concatenation). Based on the list of matching tokens, other tokens may be masked out during next token prediction, therefore ensuring that the generation will match the suffix character-by-character. Further latency optimizations may be achieved by caching very frequent suffixes such as single space by keeping a Boolean mask. For each step that is matched with the suffix, after each token generation step, the matching token is removed (by characters) from the left of the suffix and perform constrained generation until the suffix is an empty string. In some embodiment, the partial token (e.g., suffix) is determined by using the same pre-token split as in the tokenizer's 410 pre-token strategy which performs splitting using word boundaries—this allows for efficient backtracking for character matching since it may be known deterministically that any partial token cannot have crossed the pre-token boundary.

Figure 11:
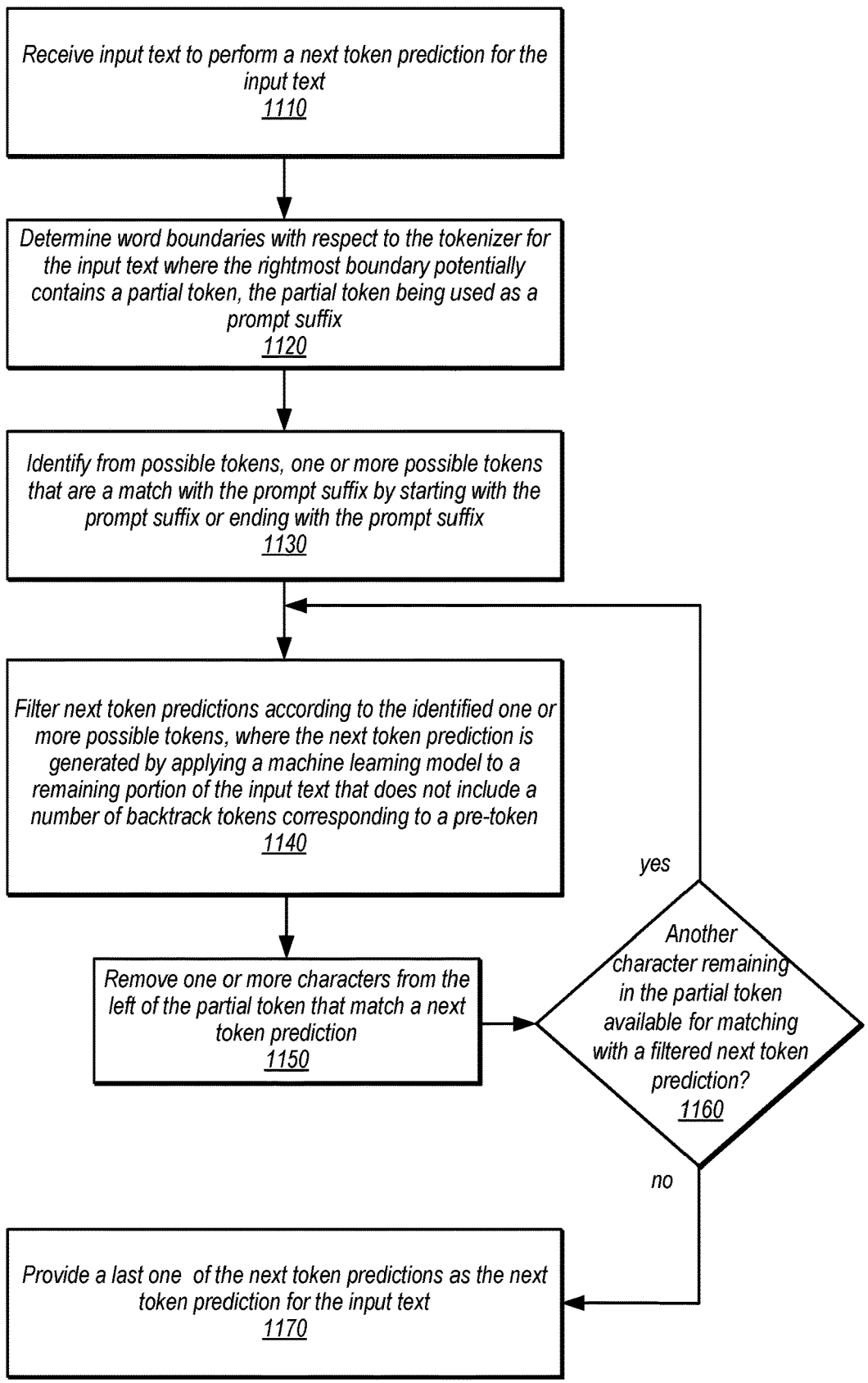
FIG. 11 is a high-level flowchart illustrating techniques and methods to implement constrained pre-fix matching for generating next token predictions, according to some embodiments.

Constrained prediction generation 440 may implement these techniques as discussed in more detail below with regard to FIGS. 11 and 12 to provide code suggestions. For example, constrained prediction generation 440 may be a feature that is enabled (or disabled) for code suggestions. In some embodiments, constrained prediction 440 may be configured (e.g., via suggestion requests) to utilize a specified maximum number of backtrack tokens (which may be dynamically determined for the code suggestion up to the maximum). Constrained prediction generation 440 may receive the tokenized input data from tokenizer 410, and then determine the backtrack tokens and partial token.

Constrained prediction generation 440 may then identify one or more possible tokens that are a match with the partial token may be identified from possible tokens, in various embodiments. For example, the possible tokens may be a vocabulary for the language (e.g., programming or human) which may have different words that could be predicted. Matches may be identified when the partial token matches either at the start or end of a possible token (e.g., possible token matches when partial token [SYS] matches the beginning of possible tokens [SYS*, or the end of possible tokens *SYS]. Matching may be performed using a trie structure as discussed above and below. A cache for common matches may also be utilized.

Constrained prediction generation 440 may then perform one or more iterations of next token predictions, filtering on the identified possible matches, using the partial token to evaluate remaining next token predictions, and subtracting, matching characters from the partial token until all characters from the partial token have been matched. Then, the code suggestion may be provided (e.g., to prediction selection 430 which may merely forward or send the next token prediction as code suggestion 401.

Figure 5:
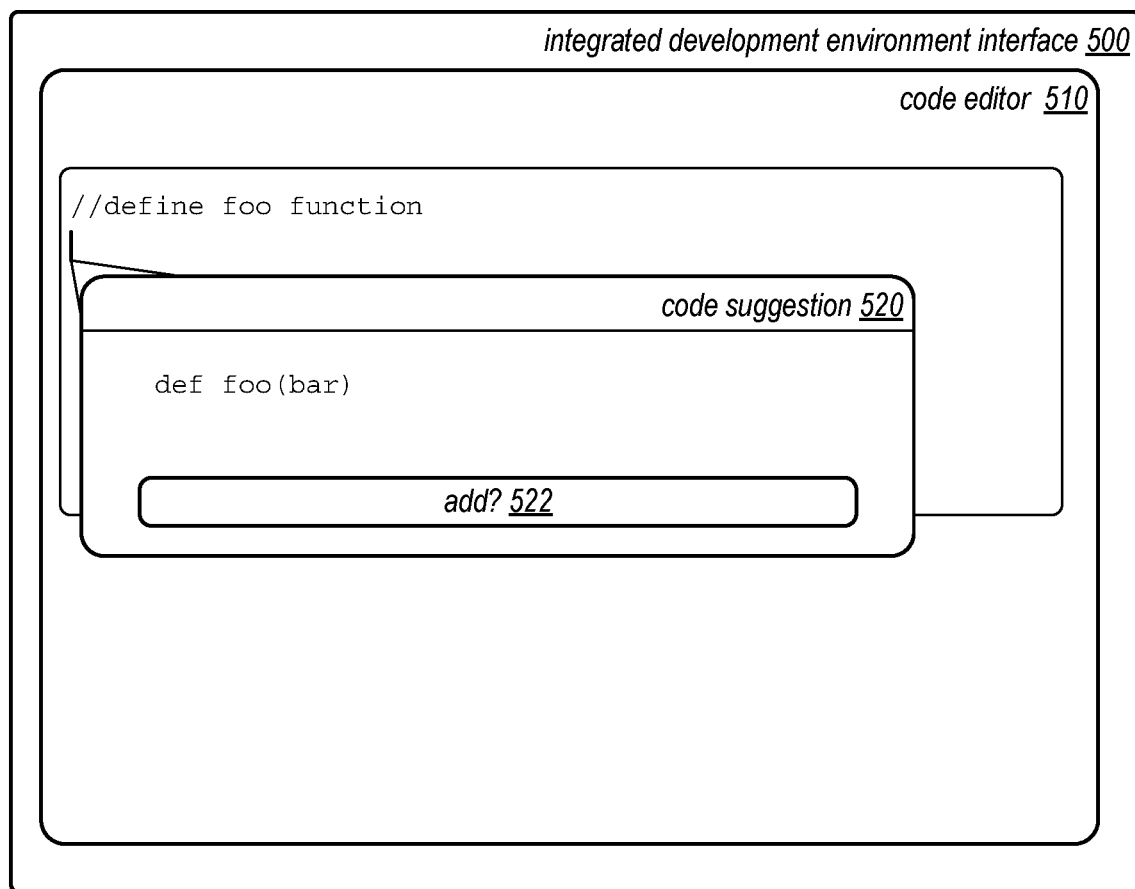
FIG. 5 is a logical block diagram illustrating an example interface of a development environment, according to some embodiments.

FIG. 5 is a logical block diagram illustrating an example interface of a development environment, according to some embodiments. Integrated development environment interface 500 may be implemented on a client of the code development service 210, as depicted in FIG. 2, or hosted as part of the code development service 210, as depicted in FIG. 2. Integrated development environment interface 500 may implement a code editor 510 (e.g., a text editor) which may allow a user to enter code in a programming language. The code suggestion feature 213 of code development service 210 may analyze the entered characters to determine a code suggestion 520, which may be displayed and added, as indicated at 522. Although not illustrated, various other information regarding the suggestion, such as the source of the code, licensing information for the code, and/or various other code metadata (e.g., style guidelines) may be displayed.

Code suggestion and other next word or token prediction techniques may encounter scenarios where a partial token is the nearest context input for code suggestion (or other next word/token prediction). Consider the following example scenario where a code suggestion is made after the cursor in the following example of Java code, where the cursor is represented as "<T>":

```
GetRecordsResult result = streamClient.getRecords(streamName);
while (result.getNextRecordMarker( ) != null) {
    // (2)
    System.out.println (result.getNextRecordMarker( ));
    result = streamClient.getRecords (streamName);
    S<T> <- current cursor
```

The expected, also the most likely guess here after the cursor should be System, which is a very common module to be referred in Java, and it also appears in above context. However, because "S" is a partial token, right before the current cursor code suggestions provided may not handle the partial token well. Consider the following example inputs with the suggested code being underlined after the cursor:

```
// Input -> S
S<T>leeper sleeper = new Sleeper(1000);
// Input -> Sy
Sy<T>strace.endSection( );
// Input -> Sys
Sys<T>out.println(result.getNex tRecordM arker( ));
// Input -> Syst
Syst<T>en.sleep(1000);
// Input -> Syste
Syste<T>.sleep(1000);
```

In the above examples creating longer partial tokens, possible suggestions may still not provide the expected "System" result. This may occur because the machine learning model used to produce the suggestions was not trained on partial tokens, like "S" or "Sy" and so on.

This training lack may occur because of how a tokenizer breaks down the training data sets for the machine learning model used to generate the suggestions. Consider the following example tokens generated from input text (on the left-hand side of "→"):

```
System -> [' System' ]
Sleeper -> [' S', 'le', 'eper'] // Prefix S<>
Systrace -> [' Sy', 'str', 'ace'] // Prefix Sy<>
Sysout -> [' Sys', 'out' ] // Prefix Sys<>
Systen -> [' S', 'yst', 'en'] // Prefix Syst
Syste -> [' S', 'yst', 'e'] // Prefix Syste
```

To address this issue, randomized segmentation of some tokens may be applied to training data sets for training or fine-tuning a machine learning model for code (or other text) suggestion. For example, one code text example may be:
System.out.prinln("test");
If we are to tokenize it as is, it looks like below:
['System', '.', 'out', '.', 'pr', 'in', 'in', '("', 'test', '");']
Instead of doing that, a random split may be inserted into the sentence, breaking the sentence into 2 parts:
'System.out.prinln("test");'→['S', 'ystem.out.prinln("test");']
Then tokenization each segment individually, then concatenate them, which will offer the below tokenization result:
['S', 'y', 'st', 'em', '.', 'out', '.', 'pr', 'in', 'ln', '("', 'test', '");']
which can be used as part of a training data set for pre-training or continuous fine-tuning.

Implementing randomized segmentation for tokens, in various embodiments, may train the machine learning model on how to compose various configurations of partial tokens with respect to an original token (e.g., "Sy" to "System"). Such techniques used for training the machine learning model can improve accuracy of partial token completion significantly without harming complete token prediction scenarios. Moreover, these techniques can be implemented without slowing down a machine learning model's speed at inference stage.

Figure 6:
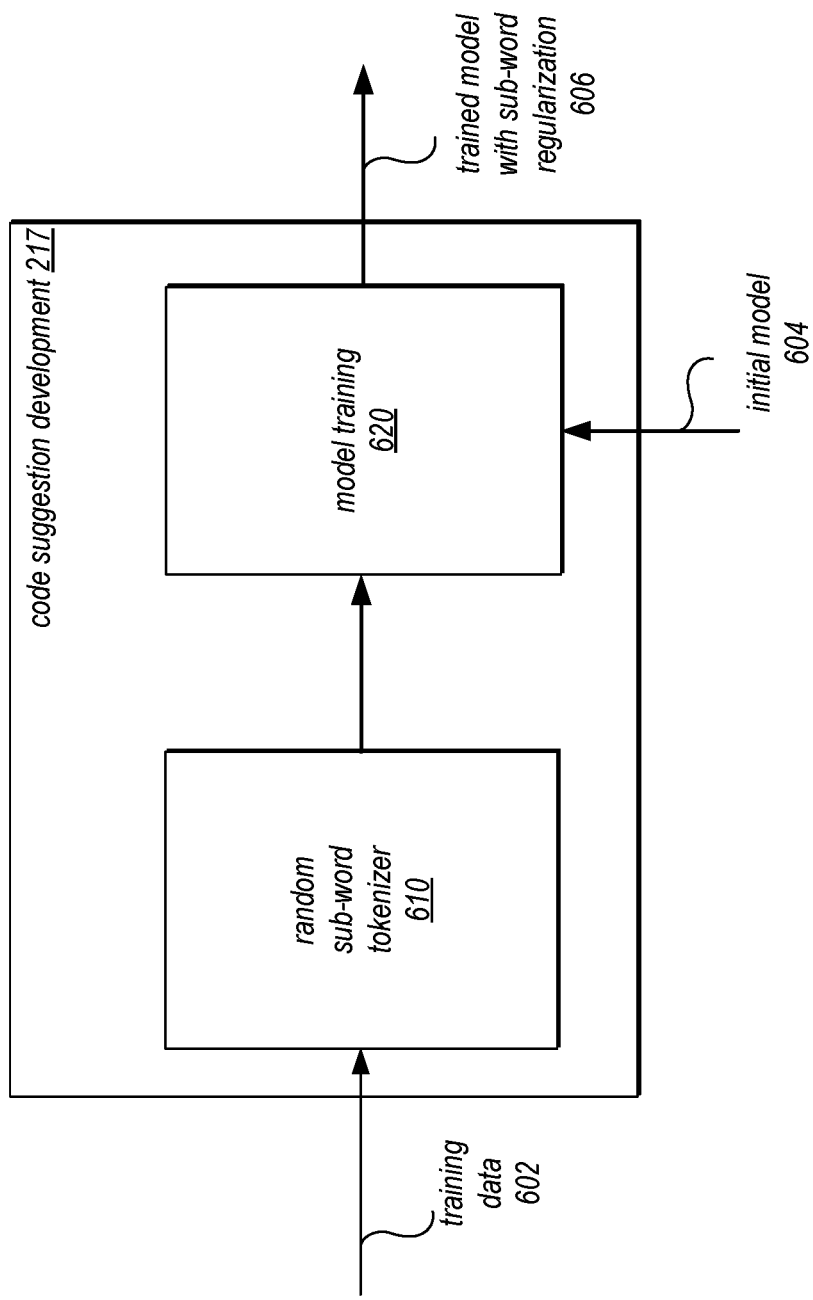
FIG. 6 is a logical block diagram illustrating an example of code suggestion development for sub-word regularization when training machine learning models, according to some embodiments.

FIG. 6 is a logical block diagram illustrating an example of code suggestion development for sub-word regularization when training machine learning models, according to some embodiments. Random subword tokenizer 610 and model training may be implemented tool, system, or feature of code suggestion development 217. In other embodiments, a separate training system, application, or service, such as a machine learning service implemented as part of provider network 200 in FIG. 2, may implement these techniques, as well as those discussed below with regard to FIGS. 13 and 14.

Figure 13:
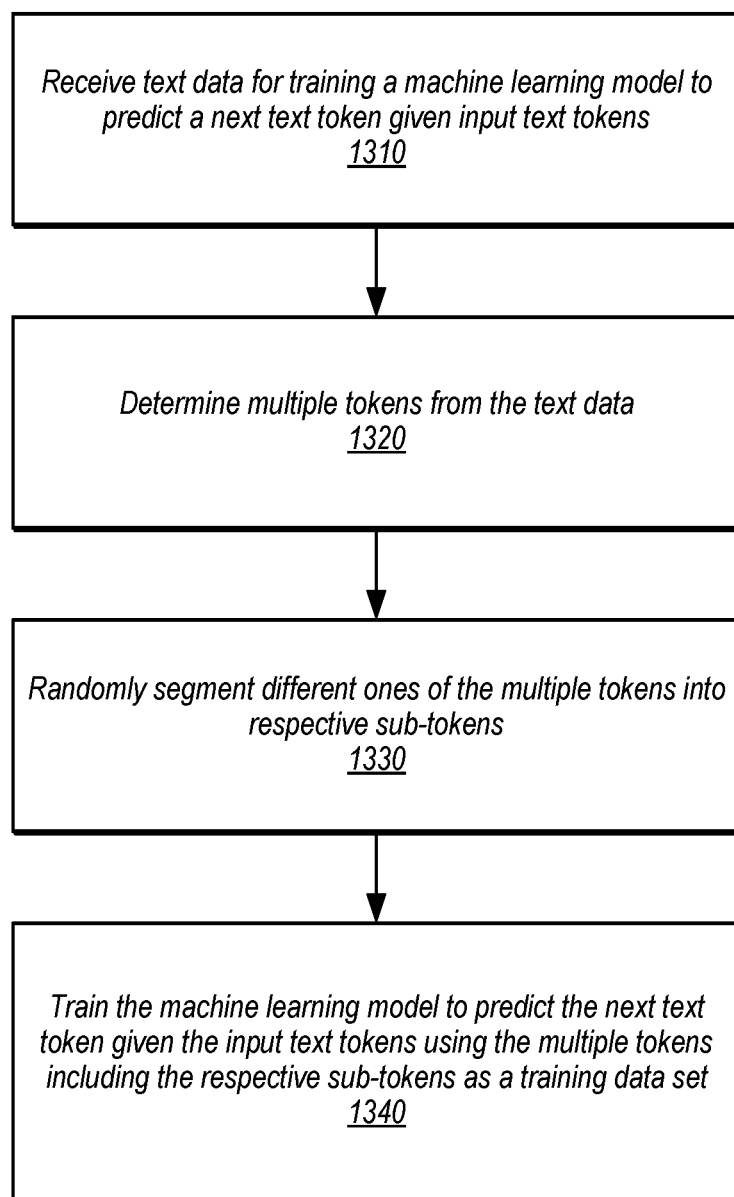
FIG. 13 is a high-level flowchart illustrating techniques and methods to implement random token segmentation for training next token prediction models, according to some embodiments.

Random sub-word tokenizer 610 may obtain training data 602 and randomly segment it, as discussed below with regard to FIGS. 13 and 14 for model training 620. For example, a request to generate partial token optimized training data may be received, which may specify a storage location or other information describing the source training data set that includes text data. Multiple tokens may be determined from the text data by random sub-word tokenizer according to some embodiments. For example, various different tokenizers may be applied to generate tokens from input text. For example, tokens may be individual words in sentences, including the prior space character before the word, "[space]word" as token. Punctuation, empty space, carriage returns, or various other characters may also be grouped or considered individually as tokens.

Random sub-word tokenizer 610 may select different ones of the multiple tokens randomly to be segmented into respective sub-tokens, in some embodiments. For example, sub-word regularization techniques may be performed to sample or identify different tokens for non-optimal segmentation. Such techniques may include selecting a token, randomly, from the tokens determined for the text data (e.g., according to a configurable variable or parameter, which may be indicated as percentage value where the percentage value indicates a likelihood that any one token will be selected for random segmentation). If a token is selected, then the token may be randomly segmented into sub-token components that are treated as tokens, instead of the source token from which they are generated.

Model training 620 may implement various machine learning training frameworks that can execute a machine learning job, application, or program on initial model 604 using the training data set produced by random sub-word tokenizer 610. Note that training may also be performed to train a model from scratch or trained given a non-regularized check-point. For example, initial model may include various neural network-based machine learning models that have already been pre-trained and thus are provided for fine-tuning, or may be a fresh model that has not been pre-trained. Various different hyperparameters or other configuration of model training may be specified as part of a training job or request and used to perform the training on initial model. Once complete, model training 620 may provide a trained model with sub-word regularization, as indicated at 606.

Another tool, system, or feature of code suggestion development 217 may be programming language conversion 710, which may convert source evaluation data sets in one programming language to another programming language. High quality evaluation datasets are time consuming to create and usually requires a large amount of annotators' time and effort. This is the case for execution-based function completion evaluation sets as well. In various embodiments, a programmatic test conversion tool from source programming language, such as Python, to other target programming languages that is applicable for tests that perform a correctness assessment based on returned values of the function with ground truth values (and thus being a value-oriented conversion). These embodiments can be used to convert many test cases which help reduce annotation time and increase the number of evaluation data sets for building and testing additional code generation systems for many different languages. These techniques may be widely applicable and used to convert existing datasets such as MBPP (Most Basic Python Programming) to Javascript, Java, Typescript, Ruby, Go, C #, or any other programming language for which conversion rule sets are generated.

In some embodiments, the conversion process starts from inferring the types of function arguments, which can be done by inspecting the argument values in each test cases. Mapping of types from python to each language such as "list" to "Arraylist" in Java or "dictionary" to "Hash Map". Values for different test cases can have different types, therefore the common superclass of all observed types for each argument may be inferred according to a type hierarchy. Since there can also be many levels of types (due to containers such as list or sets), the types may be recursively inferred to be consistent at each level. For example, 'list of list' and 'list of object' has a common type of 'list of object'. The type of expected return value can also be inferred via inspecting the expected return values in the test cases which would also match with the values of the executed function with the given inputs of that test case.

In addition to types, conversion of argument and return values from source programming language to the target programming language by generating strings that represents the target language's object which can be parsed by their respective interpreter/compiler. For example, [1,2] in Python is converted to 'Arrays.aslist(1, 2)', or {1: 2, 3: ["foo", "bar"]} in Python to 'new HashMap( ) {{put(1, 2);put(3, Arrays.aslist("foo", "bar"))}' with recursive support for any nested structure.

For test case conversion, in some embodiments, all the information regarding return types and argument/expected return values may be put together to build code that represents input/output objects in the target programming language appropriate with appropriate comparator for equality.

In addition, in some embodiments, conversion of the source programming language prompt string, including function signature and docstring containing examples of input/output, may be converted to prompt strings in other target programming languages. The style of function signature may be mimicked in each language together with appropriate return/argument types if applicable, as well as conversion of function/argument/class names to be stylistically appropriate (camel case or pascal case). The docstring may be formatted such as the inputs and outputs look as close as possible to input/output format for that particular language.

Figure 7:
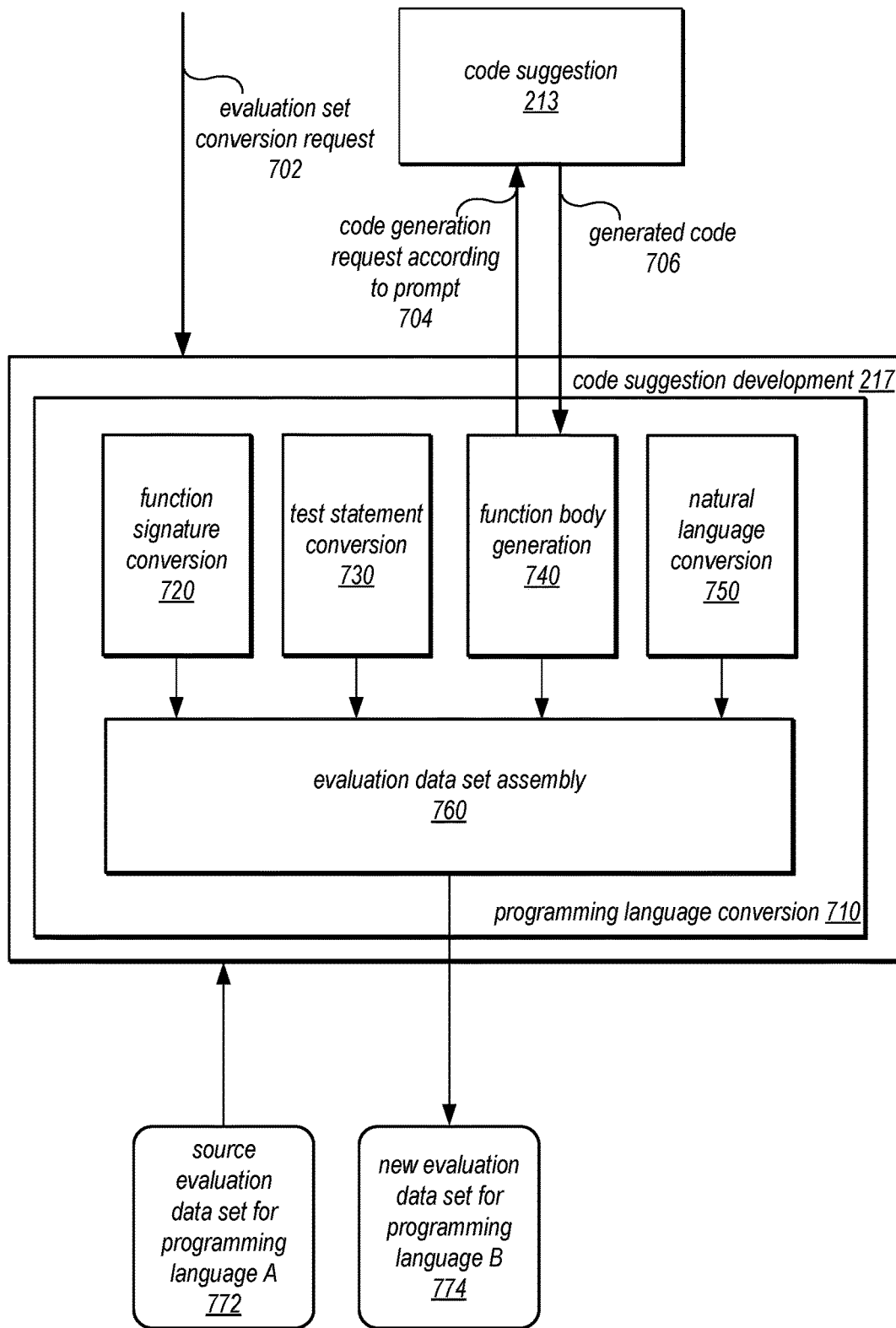
FIG. 7 is a logical block diagram illustrating an example of code suggestion development for evaluation data set conversion according to some embodiments, according to some embodiments.

FIG. 7 is a logical block diagram illustrating an example of code suggestion development for evaluation data set conversion according to some embodiments, according to some embodiments. As discussed above, and in detail below with regard to FIGS. 15-16B, programming language conversion 710 may convert given evaluation data sets from a source programming language to a target programming language. For example, programming language conversion 710 may receive a conversion request 702. Conversion request 702 may specify the source programming language and target programming language(s) for an evaluation data set as well as the storage location or other access information for the source evaluation data set, such as source evaluation data set for programming language A 772, and the target storage location, format, and/or other access information for producing the new evaluation data sets, such as storage location for new evaluation data set for programming language B 774.

Programming language conversion 710 may utilize different conversion techniques for different portions of items in an evaluation data set, such as techniques that infer or map types (e.g., recursively) for function signatures, at 720, test statement conversion 730, and natural language conversion 750. Each of these features may utilize specific conversion rules, mappings, and/or type hierarchies for a specified source programming language and target programming language.

Function signature conversion 720 may identify the function signature in source 772 by parsing an item of the evaluation data set to locate the function signature according to a parser or rule set for the first (source) programming language. In the python programming language, for example, a search (e.g., a regular expression search) may be made for "def" in order to locate the function signature, which may also be delimited with various other symbols (e.g., may include the arguments within parentheses). Once the function signature is located, different techniques may be performed to determine what the types of the respective arguments or parameters of the function are. For example, the test cases for the function may identify the values of the arguments. To complete conversion, one or mapping rules may be applied that are specific to the conversion of a function signature in the source programming language to the target programming language.

Test statement conversion 730 may use knowledge determined as part of converting the function signature 720 to convert test statements. For example, the argument format of the function signature in the source can be used to extract the various test values from the source test statements and insert them into target programming language version of the test, which may be obtained as a template test statement that accepts the arguments and triggers an error or other indication if the test statements fail.

Natural language conversion 750 may be implemented as part of converting a prompt from the source 772 to the target programming language evaluation data set 774. For example, conversion of prompts may include changing features such as the symbols used to indicate code comments (e.g., non-executable statements in the code), such as changing from """" to "/**". Conversion of prompts may also include changing the natural language statements to replace source programming language terms to target programing language terms "Write a function in Python" to "Write a function in Java" to . . . or changing between terms such as "none" to "null". In some scenarios, conversion rules may remove unnecessary or uncovertable source programming language specific statements.

Function bodies for a target programming language may be generated by sending requests from 740 to code suggestion 213, which may receive the request 704 and return generated code 706. The request may include the converted prompt of a test item and converted function signature in some embodiments.

Figure 8:
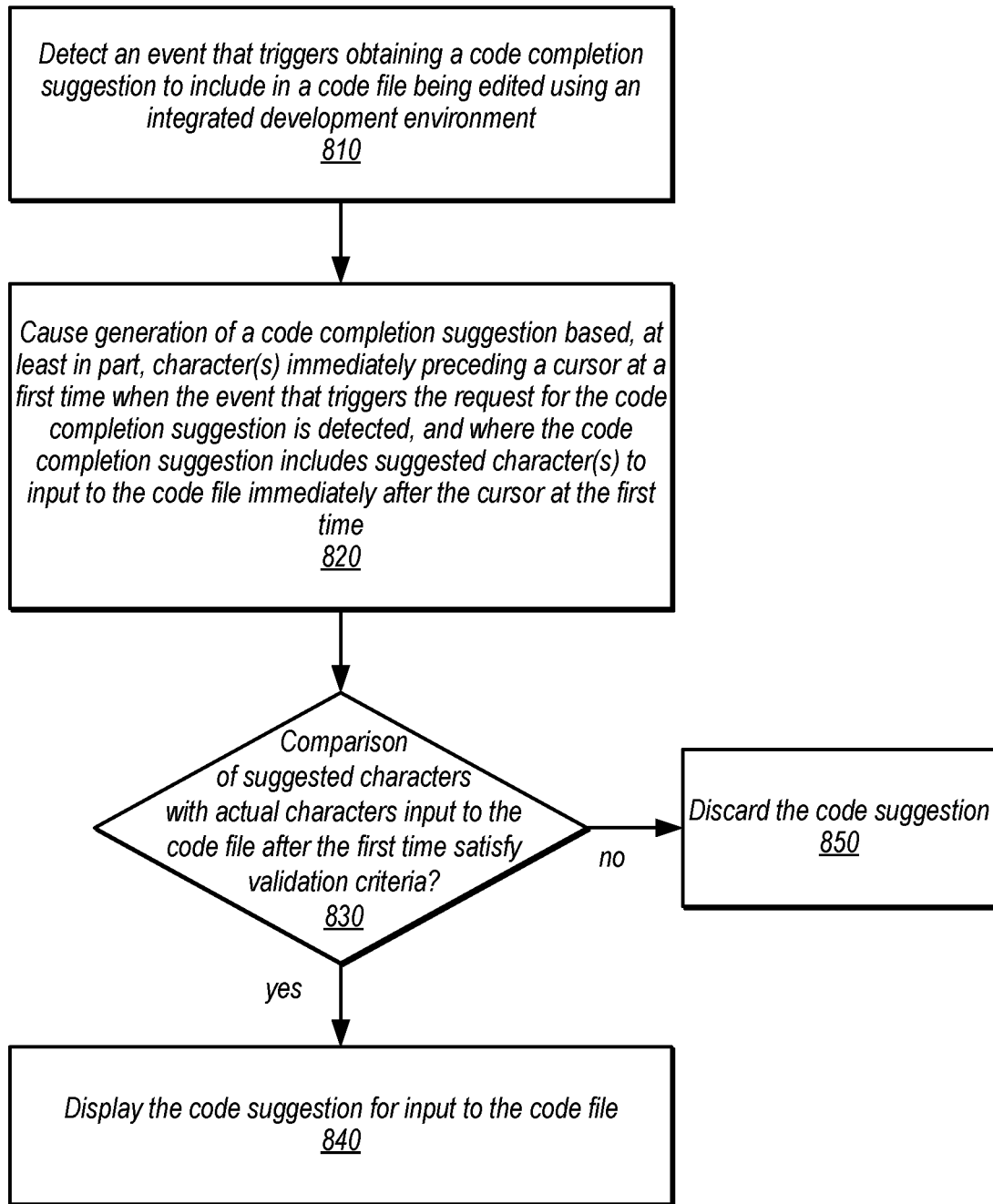
FIG. 8 is a high-level flowchart illustrating techniques and methods to implement validating and proactively providing code suggestions, according to some embodiments.

The examples of validating and proactively providing code suggestions discussed above with regard to FIGS. 2-7 have been given in regard to one example of a code development service. Various other types of code development tools, systems, or applications may implement these techniques. FIG. 8 is a high-level flowchart illustrating techniques and methods to implement validating and proactively providing code suggestions, according to some embodiments. These techniques, as well as the techniques discussed below with regard to FIGS. 9-16B, may be implemented using various components of a provider network as described above with regard to FIGS. 2-7 or other types or systems implementing code development tools or other applications.

As indicated at 810, an event that triggers obtaining a code completion suggestion to include in a code file being edited using an integrated development environment may be detected, in some embodiments. In some embodiments event that trigger obtaining a code completion suggestion may be based one or more criteria. For example, a key-stroke count (since a last code completion suggestion request was made) may be maintained. This key-stroke count alone may be an event that triggers when the number of key-stroke count cross a threshold. In some embodiments, other criteria may be consider. For example, a time elapsed since a last trigger may also be used, which may obtain a code suggestion after a period of time since a last recommendation was made elapses. In some embodiments, a combination of criteria (e.g., key-stroke and time elapsed) may be used. In some embodiments, the event trigger may be user or client-specific, based on heuristics such as entering or using particular characters or keys (e.g., after a TAB key selection to indent).

As indicated at 820, generation of a code completion suggestion may be caused, in some embodiments. The code completion suggestion may be based on character(s) immediately preceding a cursor at a first time when the event that triggers the request for the code completion suggestion is detected, and where the code completion suggestion includes suggested character(s) to input to the code file immediately after the cursor at the first time, in some embodiments. In some embodiments, code suggestion may be locally implemented and performed (e.g., by a local sub-system). In some embodiments, the code suggestion may be generated remotely (e.g., as a feature of a code development service 210 in FIG. 2).

As indicated at 830, a determination may be made as to whether a comparison of a number of suggested characters with the number of actual characters input to the code file after the first time satisfies one or more validation criteria. For example, validation criteria may be an exact match, as discussed below with regard to FIG. 9. In other embodiments, validation criteria may allow fuzzy or near matches (e.g., matching 3 of 4 characters). If no match is found, then as indicated at 850, the code suggestion may be discarded. If not, then then the code suggestion may be displayed, as indicated at 840.

Code completion suggestions may be accepted or rejected by users, which itself may trigger further code completion suggestion recommendations, in some embodiments.

Figure 9:
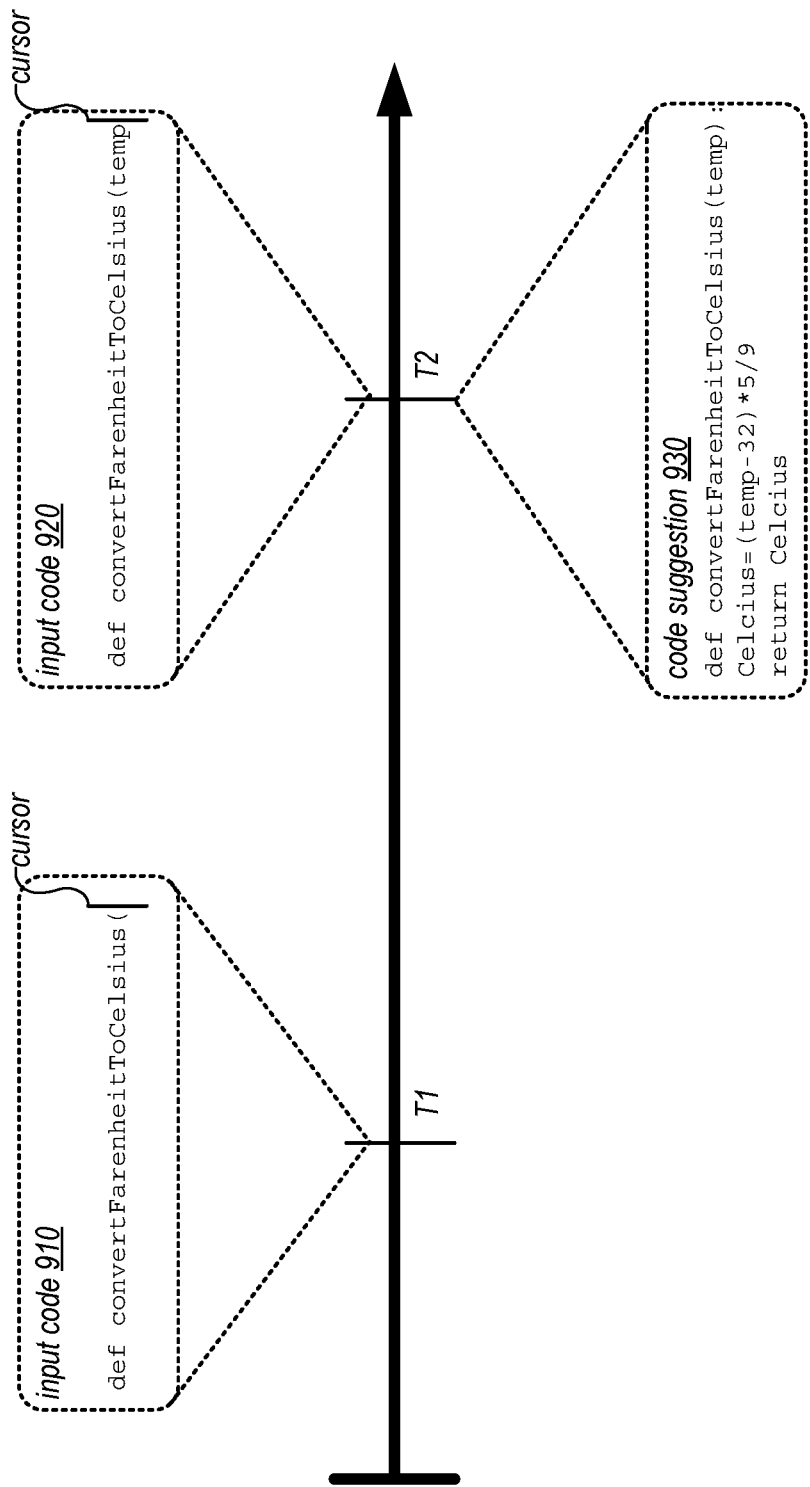
FIG. 9 is an example time for detecting, validating, and displaying code completion suggestions, according to some embodiments.
Figure 10:
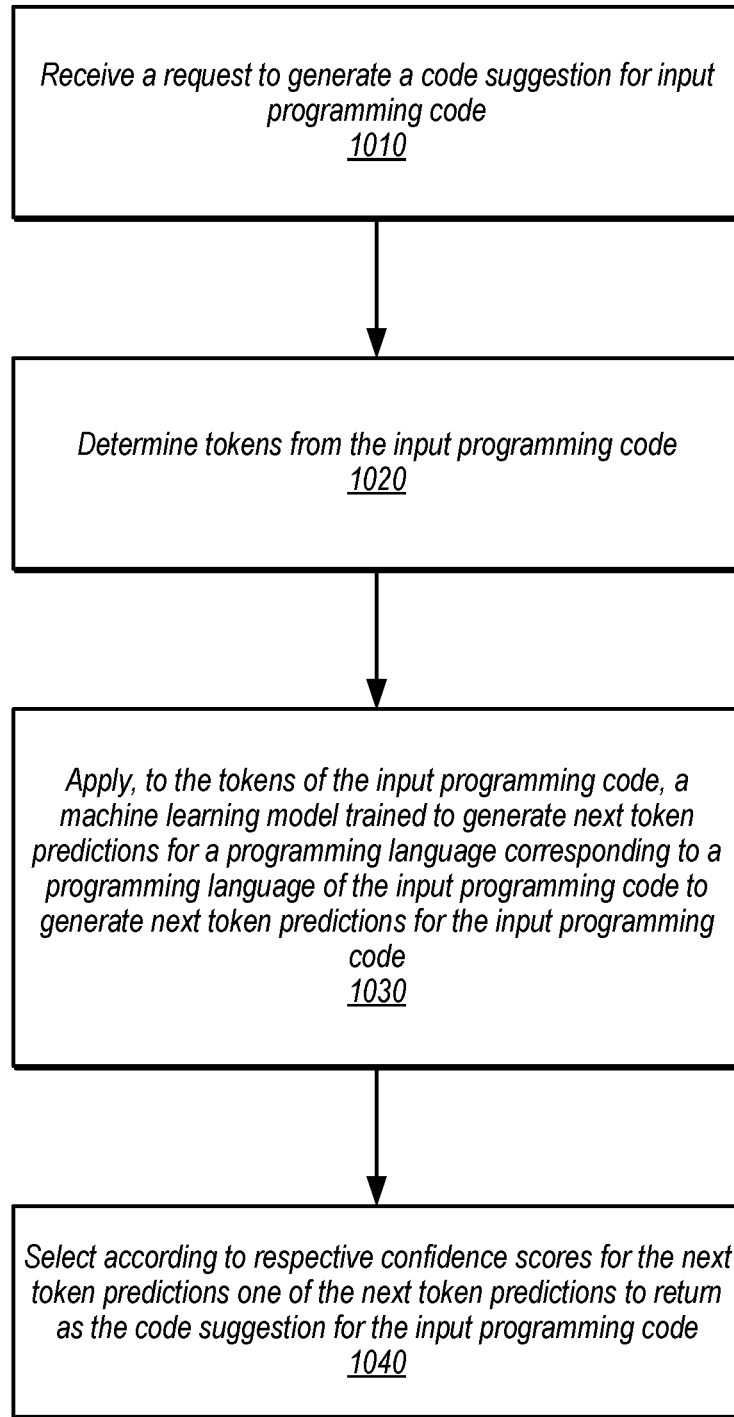
FIG. 10 is a high-level flowchart illustrating techniques and methods to implement generating code suggestions for input programming code, according to some embodiments.

FIG. 9 is an example time for detecting, validating, and displaying code completion suggestions, according to some embodiments. At time T1, input code 910 in the editor is illustrated as well as where the cursor is located. An event to trigger obtaining a code suggestion is detected. At time T2, the input code 920 has changed with additional characters being added, as indicated by the moved cursor. Code suggestion 930 may be validated by comparing a number (e.g., 4) characters with the additional characters "temp" at T2.

Code suggestions for programming languages may be provided in various embodiments, either by a code suggestion feature of a service like code development service 210 or as standalone code generation system. Many of the techniques discussed above and below for improving the performance of various phases of code suggestion may be integrated with code suggestions generated using techniques like those of FIG. 10. FIG. is a high-level flowchart illustrating techniques and methods to implement generating code suggestions for input programming code, according to some embodiments.

As indicated at 1010, a request to generate a code suggestion for input programming code may be received, in some embodiments. For example, the code suggestion request may be generated as part of an eager or anticipated code suggestion request technique discussed below with regard to FIGS. 3, 8 and, 9, or as manual request for a recommendation, in some embodiments. In some embodiments, the request may be used to perform various techniques, like generating a code suggestion to provide a converted function body for evaluation data set conversions, as discussed below with regard to FIGS. 15-16B.

As indicated at 1020, tokens may be determined from the input programming code, in some embodiments. The various tokenization techniques discussed above and below may also be performed. For example, various different tokenizers or tokenization techniques may be used. Tokens may be individual words in sentences, including the prior space character before the word, "[space]word" as token. Punctuation, empty space, carriage returns, or various other characters may also be grouped or considered individually as tokens.

As indicated at 1030, a machine learning model trained to generate next token predictions for a programming language corresponding to a programming language of the input programming code may be applied to the tokens of the input programming code to generate next token predictions for the input programming code, in some embodiments. This machine learning model may be trained using randomized token segmentation, as discussed above with regard to FIG. 6 and below with regard to FIGS. 13 and 14. Various different types of machine learning models may be used, such as a Generative Pre-trained Transformer (GPT), sequence-to-sequence models or other neural network-based model like Long Short-Term Memory (LSTM).

As indicated at 1040, one of the next token predictions may be selected according to respective confidence scores to return as the code suggestion for the input programming code, in some embodiments. In some embodiments, multiple recommendations may be generated and a number of recommendations may be provided that includes multiple recommendations (e.g., a top 3 according to confidence stores).

As discussed above with regard to FIGS. 1, 5, and 6, partial token scenarios may cause erroneous text suggestions to be produced by machine learning models. While some techniques can be applied to ameliorate the problem on the training side, as discussed above with regard to FIG. 6, and below with regard to FIGS. 13 and 14, inference-time techniques may also be implemented. In various embodiments, constrained pre-fix matching for generating next token predictions may be used in such a situation to correct for partial token suggestion errors. FIG. 11 is a high-level flowchart illustrating techniques and methods to implement constrained pre-fix matching for generating next token predictions, according to some embodiments.

As indicated at 1110, input text to perform a next token prediction for the input text may be received, in some embodiments. For example, the input text may be received as part of a request for a code suggestion, as discussed above with regard to FIGS. 4, 8, and 10, and may be an amount of code written in a programming language prior to a cursor when the code suggestion request is triggered. Input text may also be received for other text prediction or completion scenarios (e.g., text auto-completion for various use cases, such as text suggestions for drafting various documents, providing input for other requests or forms in natural language, etc.).

As indicated at 1120, word boundaries with respect to the tokenizer for the input text may be determined. The rightmost boundary potentially contains a partial token. This partial token may be used as prompt suffix to constrain the next token generation. Note: these word boundaries are bigger units that tokens and are often referred to as pre-tokens The last token may be a partial token. For example, various different tokenizers or tokenization techniques may be used. Tokens may be individual words in sentences, including the prior space character before the word, "[space] word" as token. Punctuation, empty space, carriage returns, or various other characters may also be grouped or considered individually as tokens.

In some embodiments, the "pre-tokens" that occur immediately before the partial token may be identified. From these pre-tokens, backtrack tokens may be determined. For example, starting with the pre-token immediately preceding the prompt suffix, one or more of the pre-tokens may be added to the backtrack tokens working backward in the order of tokens until a maximum number of backtrack tokens is reached or a special character (e.g., a carriage return) is reached. In some embodiments, the maximum number of backtrack tokens may be a configurable parameter for next token prediction (e.g., as part of a request for next token prediction or as a separate configuration request).

As indicated at 1130, one or more possible tokens that are a match with the prompt suffix may be identified from possible tokens, in various embodiments. For example, the possible tokens may be a vocabulary for the language (e.g., programming or human) which may have different words that could be predicted. Matches may be identified when the prompt suffix matches either at the start or end of a possible token (e.g., possible token matches when prompt suffix [SYS] matches the beginning of possible tokens [SYS*, or the end of possible tokens *SYS].

In some embodiments, one or more different data structures may be used to identify the matching possible tokens. For example a trie data structure may be used to store the different possible tokens. A trie may be a search tree for prefixes (or suffixes) where the trie may be string-indexed for a vocabulary of words where individual nodes contain links to suffix child nodes that add additional characters to the suffix at each child node. Another example of a data structure that may be used to efficiently identify matching tokens may be a cache of possible matching tokens (e.g., as a Boolean mask).

As indicated at 1140, next token predictions may be filtered according to the identified one or more possible tokens, where the next token predictions are generated by applying a machine learning model to a remaining portion of the input text that does not include the number of backtrack tokens corresponding to the pre-token, in some embodiments. For example, the given input to the machine learning model may have a number of input tokens from the text prior to the cursor (including the partial token), such as 15 tokens where token 15 is the partial token. If the number of backtrack tokens is 3, then tokens 14, 13, and 12 (adjacent to token 15) may not be used as input for a next token prediction machine learning model, so that the input may instead be tokens preceding backward from token 11 to 1 (and may include 3 more preceding tokens to make up for the backtrack tokens) and partial token 15.

The result of the next token prediction given the input tokens may include a number of different token predictions with varying confidence values. Those token predictions that are not one of the identified possible tokens may be removed from consideration. A highest confidence score remaining one of the predictions may be identified.

For this remaining next token prediction, the number of characters that match the partial token may be subtracted from the left of the partial token, as indicated at 1150. If no further characters remain, as indicated at 1160, then the next token prediction may be provided as the next token prediction, as indicated at 1170. If not, then the remaining characters may be used to perform another iteration of next token predictions, as indicated by the positive exit from 1160 until no more characters remain.

Figure 12:
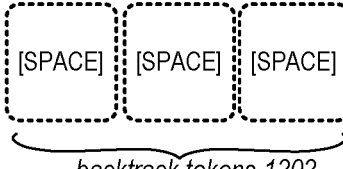
FIG. 12 is a logical block diagram illustrating different iterations of constrained pre-fix matching, according to some embodiments.

FIG. 12 is a logical block diagram illustrating different iterations of constrained pre-fix matching, according to some embodiments, as discussed above with regard to FIG. 11. Iteration 1201 illustrates the input, which includes the remaining portion, but not back track tokens 1202, and partial token (e.g., "[SPACE] S Y S T E"). The highest confidence, filtered prediction may be "[SPACE] S Y". This may be used to subtract the matching characters from partial token, as illustrated in iteration 1203, such that "S T E" remains. For this iteration, the prediction may be "[SPACE] S Y S T". After subtraction, partial token is "E". For iteration 1205, the prediction may then be "[SPACE] S Y S T E M", which would match the remaining character "E", ending the iterations and use the prediction "[SPACE] S Y S T E M" as the next token prediction.

As discussed above with regard to FIGS. 1 and 6, the training data for code suggestion and other text generation systems may encounter difficulties when partial tokens are included as part of the input for a text generation inference, such as may occur in various auto-completion scenarios where text (e.g., code) is generated to complete the next portion of text automatically given the input context of previously entered text up to some partial token (e.g., a partial or incomplete word). To improve the ability of a machine learning model to account for these scenarios, the training data sets may have to include data items that train for these partial token scenarios. FIG. 13 is a high-level flowchart illustrating techniques and methods to implement random token segmentation for training next token prediction models, according to some embodiments.

As indicated at 1310, text data for training a machine learning model to predict a next text token given input text tokens may be received, in some embodiments. For example, a request to generate partial token optimized training data may be received, which may specify a storage location or other information describing the source training data set that includes text data. In some embodiments, this request may be received or specified as part of a training job submitted to a machine learning system or service, such as a machine learning service implemented as part of a provider network like provider network 200 in FIG. 2.

As indicated at 1320, multiple tokens may be determined from the text data, according to some embodiments. For example, various different tokenizers may be applied to generate tokens from input text. For example, tokens may be individual words in sentences, including the prior space character before the word, "[space]word" as token. Punctuation, empty space, carriage returns, or various other characters may also be grouped or considered individually as tokens.

As indicated at 1330, different ones of the multiple tokens may be randomly segmented into respective sub-tokens, in some embodiments. For example, sub-word regularization techniques may be performed to sample or identify different tokens for non-optimal segmentation. FIG. 14 discussed below provides an example of random token segmentation. Such techniques may include selectin a token, randomly, from the tokens determined for the text data (e.g., according to a configurable variable or parameter, which may be indicated as percentage value where the percentage value indicates a likelihood that any one token will be selected for random segmentation). If a token is selected, then the token may be randomly segmented into sub-token components that are treated as tokens, instead of the source token from which they are generated.

As indicated at 1340, the machine learning model may be trained to predict the next token given the input text tokens using the multiple tokens, including the respective sub-tokens as a training data set, in some embodiments. In some embodiments, the trained machine learning model may be stored in a location specified in a training request. In some embodiments, the machine learning model may be deployed for different applications, including code suggestion as discussed above or auto-completion applications for text. Various different training techniques and machine learning model types for next token prediction may be used, such as a sequence-to-sequence model or other neural network-based model like Long Short-Term Memory (LTSM).

Figure 14:
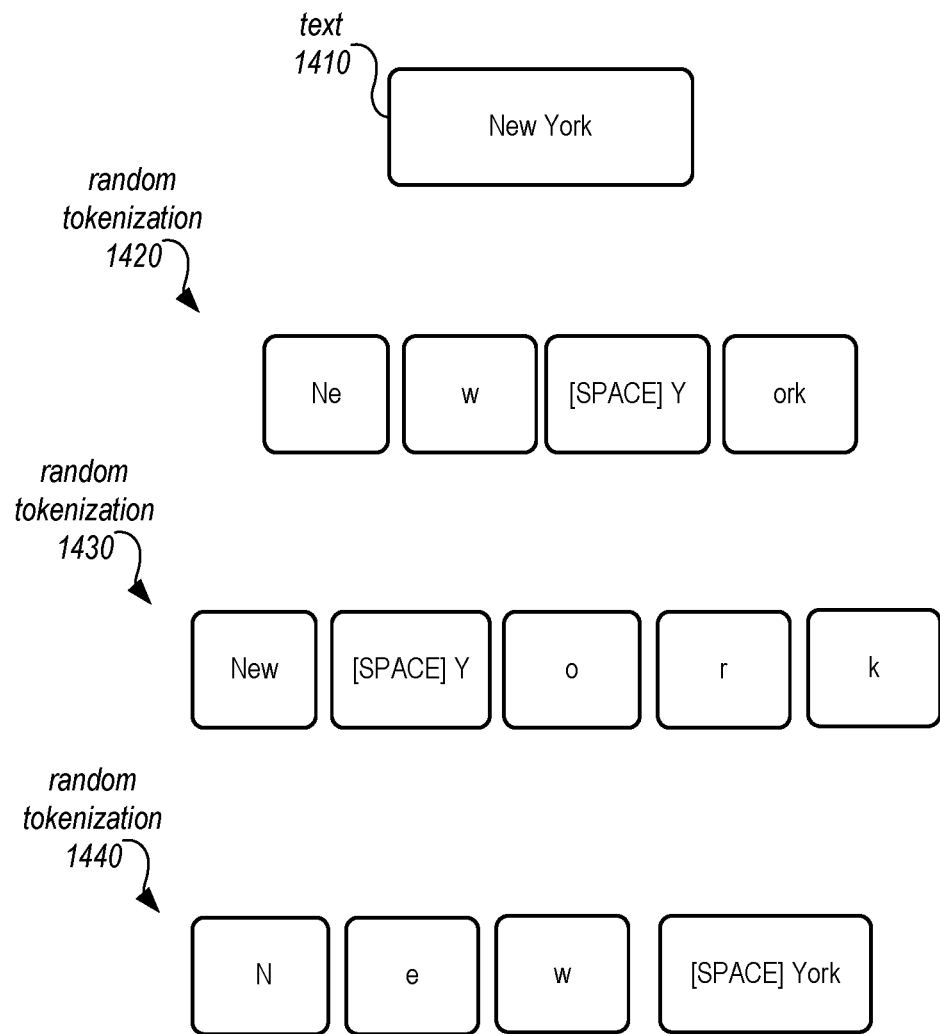
FIG. 14 is a logical block diagram illustrating possible random tokenizations of text, according to some embodiments.

FIG. 14 is a logical block diagram illustrating possible random tokenizations of text, according to some embodiments. As indicated at 1410, text data, such as "New York" may be exemplary of longer text strings that may be tokenized for a training data set as discussed above with regard to FIG. 13. Each word, "New" and "York" may be a separate token. Because tokenization may be randomly performed, such as by using sub-word regularization techniques, different examples may be generated, such as indicated at 1420, 1430, and 1440 (where each block is a sub-token). In these example, a random selection of whether a token is selected for further segmentation is made (e.g., both in 1420, "York" in 1430, and "New" in 1440). Random segmentation may result in two or more segments and may include treating individual characters as sub-tokens, in some embodiments.

As discussed above with regard to FIGS. 1 and 7, high quality data sets for training and evaluating different systems, services, or application, such as those that are implemented to provide code or other text suggestions as discussed above, may be difficult to obtain. Some data sets, such as evaluation data sets may be highly specialized. For example, an evaluation data set for code suggestion systems may rely upon various code prompts or problems to solve. A code prompt may describe a programming problem that can be ingested by a code suggestion system and then have a corresponding portion of code generated to solve or satisfy the problem. For example, a prompt may be descry be a function to check if a given number is odd or even. Various example assertions or unit tests may be included that can be used determine if the generated code returns the correct value satisfy the test. In order to increase the number of high quality evaluation data sets that are available, techniques to generate new high quality evaluation data sets may be highly desirable.

Figure 15:
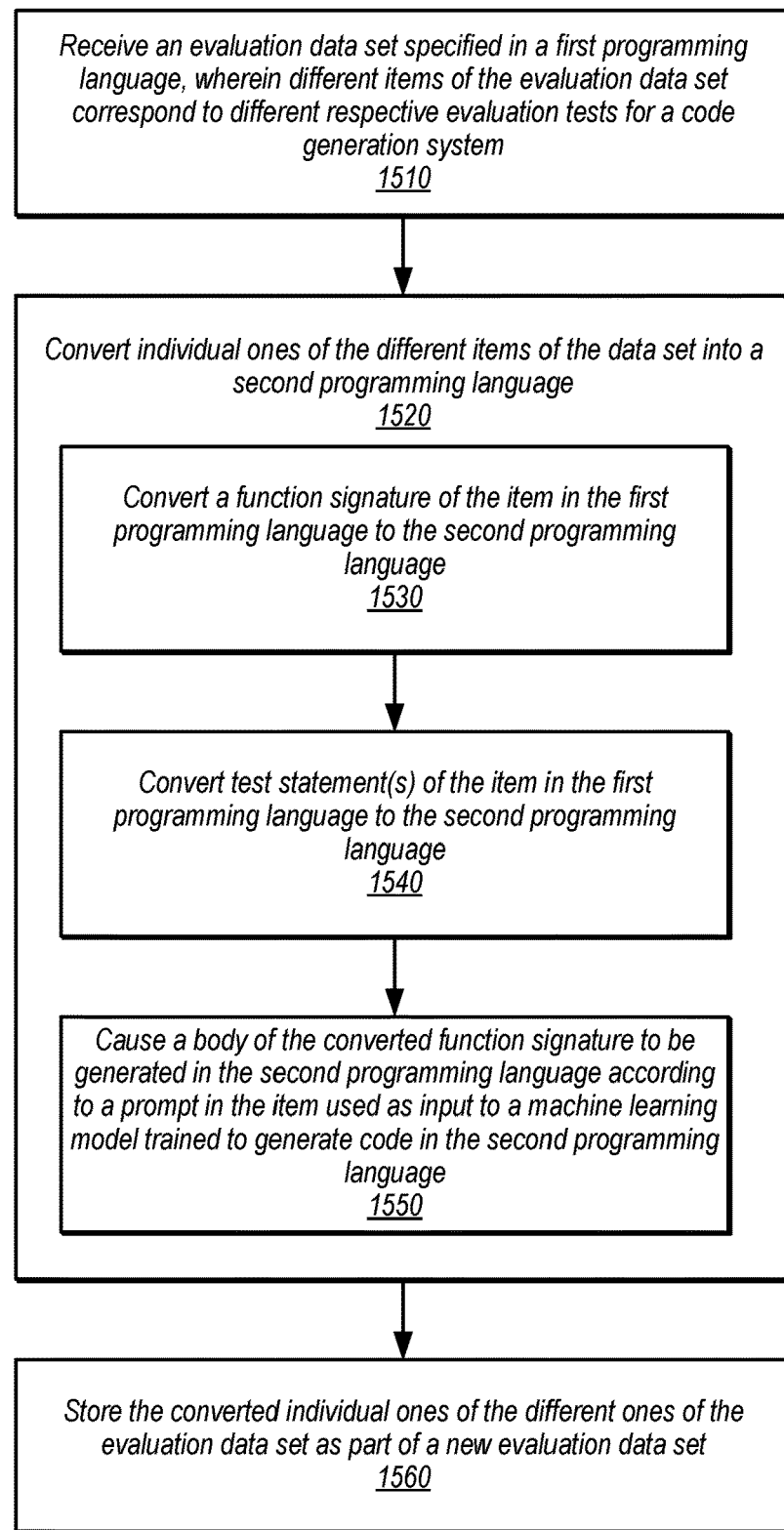
FIG. 15 is a high-level flowchart illustrating techniques and methods to implement programmatically generating evaluation data sets for code generation systems, according to some embodiments.

FIG. 15 is a high-level flowchart illustrating techniques and methods to implement programmatically generating evaluation data sets for code generation systems, according to some embodiments. The techniques may be implemented by various types of systems for testing, developing, or implementing code suggestion or other code generation systems. In some embodiments, a programming language conversion system may include a suite of tools, including a tool for programmatically generating evaluation data sets for code generation systems.

As indicated at 1510, an evaluation data set specified in a first programming language, wherein different items of the evaluation data set correspond to different respective evaluation tests for a code generation system, may be received, in some embodiments. For example, one or more files, objects, locations, or other information to access and obtain the evaluation data set may be provided as part of a request to perform a conversion of an evaluation data set from a first (e.g., source) programming language to a second (e.g., target) programming language. In some embodiments, multiple target programming languages may be specified as part of the request, and thus multiple performances of the technique, as discussed below.

As indicated at 1520, individual ones of the different items of the data set into a second programming language may be converted, in some embodiments. For example, conversion of prompts may include changing features such as the symbols used to indicate code comments (e.g., non-executable statements in the code), such as changing from """"" to "/**". Conversion of prompts may also include changing the natural language statements to replace source programming language terms to target programing language terms "Write a function in Python" to "Write a function in Java" to . . . or changing between terms such as "none" to "null". In some scenarios, conversion rules may remove unnecessary or uncovertable source programming language specific statements.

As indicated at 1530, a function signature of the item in the first programming language to the second programming language may be converted. For example, the function signature may be identified by parsing an item of the evaluation data set to locate the function signature according to a parser or rule set for the first (source) programming language. In the python programming language, for example, a search (e.g., a regular expression search) may be made for "def" in order to locate the function signature, which may also be delimited with various other symbols (e.g., may include the arguments within parentheses).

Once the function signature is located, different techniques may be performed to determine what the types of the respective arguments or parameters of the function are. For example, the test cases for the function may identify the values of the arguments. In FIG. 16A, for example, function signature 1612 may provide the data set source item 1610 being converted. Function signature 1612 may have been located (as discussed above), and then evaluated to determine the values of the arguments "cost, m, n". One of the test cases indicate that the candidate function has inputs such "[[1, 2, 3], [4, 8, 2], [1, 5, 3]], 2, 2" which can be broken into cost as "[[1, 2, 3], [4, 8, 2], [1, 5, 3]]", m as "2", and n as "2". Thus, cost may be a list, and m and n may be int's. The return value may also be inferred from the tests, e.g., "[[1, 2, 3], [4, 8, 2], [1, 5, 3]], 2, 2==8" where "8" is the desired return value for that test case. In some embodiments, return value determination can include executing both the source test items function with a test to identify the value returned.

To complete conversion, one or mapping rules may be applied that are specific to the conversion of a function signature in the source programming language to the target programming language. In the illustrated examples of FIGS. 16A and 16B, mapping rules to convert the text of function signature 1612 in Python to Java in 1624 are applied, where "def" is converted as "class MinCost{public static in Min-Cost (List<List<Integer>> cost, int m, int n{". The determinations of arguments, as discussed above may allow for the mapping of determined source value types to target value types which are declared explicitly in the Java example 1624 (e.g., "List", "integer" and "integer"). In some scenarios, the argument is a list of heterogeneous data (could be a list, a set, etc, as elements). To perform conversion, inference techniques may examine the data type by recursively looking at the elements. The most general type given all the values, may be selected, in such techniques. For example, if one argument value of type List<Integer> and the other argument value if of type List<Double>, then the type should be List<Double>. In another example, if one argument type is List<List<Integer>> and the other argument type is List<HashMap<Integer, String>>, then the type would be List<Object>.

As indicated at 1540, test statement(s) of the item in the first programming language to the second programming language may be converted, in some embodiments. Some knowledge determined as part of converting the function signature may be used for converting test statements. For example, the argument format "(cost, m, n)" can be used to extract the various test values from 1618 and insert them into target programming language version of the test, such as converting from "assert candidate" to class Main public static void main(String[ ] args) throws Exception if (!(Min-Cost.MinCost(Arrays.asList(Arrays.asList(1, 2, 3), Arrays.asList(4,8,2),Arrays.asList(1,5,3)),2,2)==8) throw new java.lang.Exception("Exception—test case 0 did not pass");}" as indicated in test statements 1628. This may be repeated for each test.

As indicated at 1550, a body of the converted function signature may be caused to be generated in the second programming language according to a prompt in the item used as input to a machine learning model trained to generate code in the second programming language, in some embodiments. For example, as discussed in detail below with regard to FIGS. 1, 2, 4, and 10, code generation techniques may take as input a given portion of code or natural language statements describing the code to generate, and generate suggested code. Thus a code conversion system (or other system, service, or application performing the recited techniques of FIG. 15) may invoke via an interface a code generation system or a locally implemented machine learning model to generate the function body code in the target programming language (e.g., by specifying the target programming language in order to cause the use of the machine learning model specific to that target programming language).

In various embodiments, assembly of the different converted item portions may be completed according to one or more conversion rules for items of an evaluation data set in a source programming to a target programming language. For example, the ordering of parts may change from one programming language. In FIG. 16A, for instance, the test item is ordered function signature 1612, then prompt 1614, then function body 1616, and finally test statements 1618, where as in the converted version of 1620, the ordering is prompt 1622, then function signature 1624, then function body 1626, and finally test statements 1628. Different programming languages may have different required orderings which may be accounted for when assembling the converted version.

As indicated at 1560, the converted individual ones of the different ones of the evaluation data set as part of a new evaluation data set may be stored, in some embodiments. For example, each item in the evaluation data set may be a different file, document, or other object. As each new converted item is created, the corresponding different file, document, or object may be added to the target storage location for the new evaluation data set. In some embodiments, various errors may trigger notifications and/or storing the source item in a separate storage location for manual conversion (e.g., sending a notification that the source item should be reviewed).

The methods described herein may in various embodiments be implemented by any combination of hardware and software. For example, in one embodiment, the methods may be implemented by a computer system (e.g., a computer system as in FIG. 17) that includes one or more processors executing program instructions stored on a computer-readable storage medium coupled to the processors. The program instructions may be configured to implement the functionality described herein (e.g., the functionality of various servers and other components that implement a provider network described herein). The various methods as illustrated in the figures and described herein represent example embodiments of methods. The order of any method may be changed, and various elements may be added, reordered, combined, omitted, modified, etc.

Figure 17:
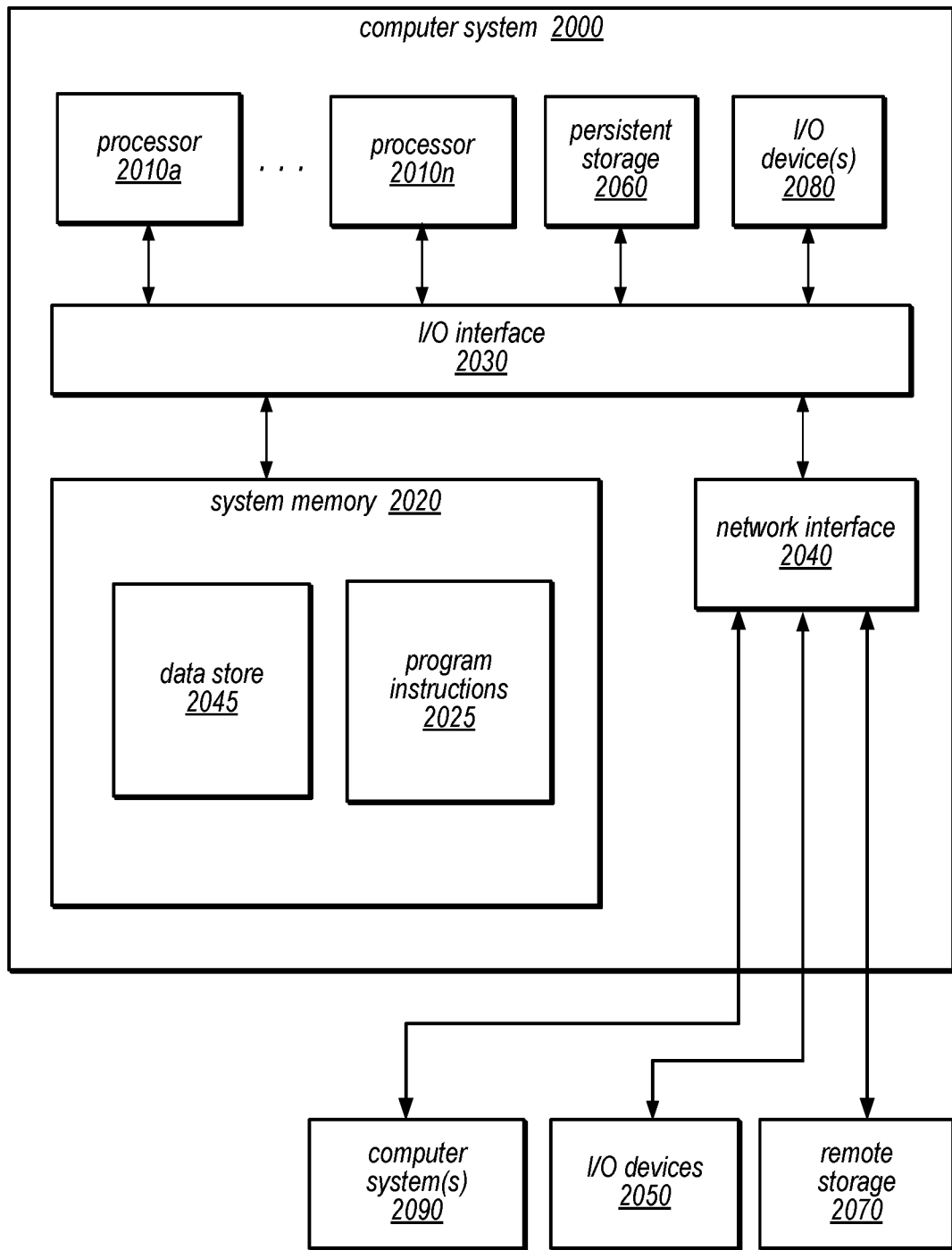
FIG. 17 is a block diagram illustrating an example computing system, according to some embodiments.

The techniques discussed above may be executed on one or more computer systems, which may interact with various other devices. FIG. 17 is a block diagram illustrating an example computer system, according to various embodiments. For example, computer system 2000 may be configured to implement nodes of a compute cluster, a distributed key value data store, and/or a client, in different embodiments. Computer system 2000 may be any of various types of devices, including, but not limited to, a personal computer system, desktop computer, laptop or notebook computer, mainframe computer system, handheld computer, workstation, network computer, a consumer device, application server, storage device, telephone, mobile telephone, or in general any type of computing device.

Computer system 2000 includes one or more processors 2010 (any of which may include multiple cores, which may be single or multi-threaded) coupled to a system memory 2020 via an input/output (I/O) interface 2030. Computer system 2000 further includes a network interface 2040 coupled to I/O interface 2030. In various embodiments, computer system 2000 may be a uniprocessor system including one processor 2010, or a multiprocessor system including several processors 2010 (e.g., two, four, eight, or another suitable number). Processors 2010 may be any suitable processors capable of executing instructions. For example, in various embodiments, processors 2010 may be general-purpose or embedded processors implementing any of a variety of instruction set architectures (ISAs), such as the x86, PowerPC, SPARC, or MIPS ISAs, or any other suitable ISA. In multiprocessor systems, each of processors 2010 may commonly, but not necessarily, implement the same ISA. The computer system 2000 also includes one or more network communication devices (e.g., network interface 2040) for communicating with other systems and/or components over a communications network (e.g. Internet, LAN, etc.). For example, a client application executing on system 2000 may use network interface 2040 to communicate with a server application executing on a single server or on a cluster of servers that implement one or more of the components of the provider network described herein. In another example, an instance of a server application executing on computer system 2000 may use network interface 2040 to communicate with other instances of the server application (or another server application) that may be implemented on other computer systems (e.g., computer systems 2090).

In the illustrated embodiment, computer system 2000 also includes one or more persistent storage devices 2060 and/or one or more I/O devices 2080. In various embodiments, persistent storage devices 2060 may correspond to disk drives, tape drives, solid state memory, other mass storage devices, or any other persistent storage device. Computer system 2000 (or a distributed application or operating system operating thereon) may store instructions and/or data in persistent storage devices 2060, as desired, and may retrieve the stored instruction and/or data as needed. For example, in some embodiments, computer system 2000 may host a storage system server node, and persistent storage 2060 may include the SSDs attached to that server node.

Computer system 2000 includes one or more system memories 2020 that are configured to store instructions and data accessible by processor(s) 2010. In various embodiments, system memories 2020 may be implemented using any suitable memory technology, (e.g., one or more of cache, static random access memory (SRAM), DRAM, RDRAM, EDO RAM, DDR 20 RAM, synchronous dynamic RAM (SDRAM), Rambus RAM, EEPROM, non-volatile/Flash-type memory, or any other type of memory). System memory 2020 may contain program instructions 2025 that are executable by processor(s) 2010 to implement the methods and techniques described herein. In various embodiments, program instructions 2025 may be encoded in platform native binary, any interpreted language such as Java™ byte-code, or in any other language such as C/C++, Java™, etc., or in any combination thereof. For example, in the illustrated embodiment, program instructions 2025 include program instructions executable to implement the functionality of a provider network, in different embodiments. In some embodiments, program instructions 2025 may implement multiple separate clients, server nodes, and/or other components.

In some embodiments, program instructions 2025 may include instructions executable to implement an operating system (not shown), which may be any of various operating systems, such as UNIX, LINUX, Solaris™, MacOS™, Windows™, etc. Any or all of program instructions 2025 may be provided as a computer program product, or software, that may include a non-transitory computer-readable storage medium having stored thereon instructions, which may be used to program a computer system (or other electronic devices) to perform a process according to various embodiments, such as various techniques for discovering matching code sources according to index and comparative similarity. A non-transitory computer-readable storage medium may include any mechanism for storing information in a form (e.g., software, processing application) readable by a machine (e.g., a computer). Generally speaking, a non-transitory computer-accessible medium may include computer-readable storage media or memory media such as magnetic or optical media, e.g., disk or DVD/CD-ROM coupled to computer system 2000 via I/O interface 2030. A non-transitory computer-readable storage medium may also include any volatile or non-volatile media such as RAM (e.g. SDRAM, DDR SDRAM, RDRAM, SRAM, etc.), ROM, etc., that may be included in some embodiments of computer system 2000 as system memory 2020 or another type of memory. In other embodiments, program instructions may be communicated using optical, acoustical or other form of propagated signal (e.g., carrier waves, infrared signals, digital signals, etc.) conveyed via a communication medium such as a network and/or a wireless link, such as may be implemented via network interface 2040.

In some embodiments, system memory 2020 may include data store 2045, which may be configured as described herein. In general, system memory 2020 (e.g., data store 2045 within system memory 2020), persistent storage 2060, and/or remote storage 2070 may store data blocks, replicas of data blocks, metadata associated with data blocks and/or their state, configuration information, and/or any other information usable in implementing the methods and techniques described herein.

In one embodiment, I/O interface 2030 may be configured to coordinate I/O traffic between processor 2010, system memory 2020 and any peripheral devices in the system, including through network interface 2040 or other peripheral interfaces. In some embodiments, I/O interface 2030 may perform any necessary protocol, timing or other data transformations to convert data signals from one component (e.g., system memory 2020) into a format suitable for use by another component (e.g., processor 2010). In some embodiments, I/O interface 2030 may include support for devices attached through various types of peripheral buses, such as a variant of the Peripheral Component Interconnect (PCI) bus standard or the Universal Serial Bus (USB) standard, for example. In some embodiments, the function of I/O interface 2030 may be split into two or more separate components, such as a north bridge and a south bridge, for example. Also, in some embodiments, some or all of the functionality of I/O interface 2030, such as an interface to system memory 2020, may be incorporated directly into processor 2010.

Network interface 2040 may be configured to allow data to be exchanged between computer system 2000 and other devices attached to a network, such as other computer systems 2090 (which may implement one or more storage system server nodes, database engine head nodes, and/or clients of the database systems described herein), for example. In addition, network interface 2040 may be configured to allow communication between computer system 2000 and various I/O devices 2050 and/or remote storage 2070. Input/output devices 2050 may, in some embodiments, include one or more display terminals, keyboards, keypads, touchpads, scanning devices, voice or optical recognition devices, or any other devices suitable for entering or retrieving data by one or more computer systems 2000. Multiple input/output devices 2050 may be present in computer system 2000 or may be distributed on various nodes of a distributed system that includes computer system 2000. In some embodiments, similar input/output devices may be separate from computer system 2000 and may interact with one or more nodes of a distributed system that includes computer system 2000 through a wired or wireless connection, such as over network interface 2040. Network interface 2040 may commonly support one or more wireless networking protocols (e.g., Wi-Fi/IEEE 802.11, or another wireless networking standard). However, in various embodiments, network interface 2040 may support communication via any suitable wired or wireless general data networks, such as other types of Ethernet networks, for example. Additionally, network interface 2040 may support communication via telecommunications/telephony networks such as analog voice networks or digital fiber communications networks, via storage area networks such as Fibre Channel SANs, or via any other suitable type of network and/or protocol. In various embodiments, computer system 2000 may include more, fewer, or different components than those illustrated in FIG. 17 (e.g., displays, video cards, audio cards, peripheral devices, other network interfaces such as an ATM interface, an Ethernet interface, a Frame Relay interface, etc.)

It is noted that any of the distributed system embodiments described herein, or any of their components, may be implemented as one or more network-based services. For example, a compute cluster within a computing service may present computing services and/or other types of services that employ the distributed computing systems described herein to clients as network-based services. In some embodiments, a network-based service may be implemented by a software and/or hardware system designed to support interoperable machine-to-machine interaction over a network. A network-based service may have an interface described in a machine-processable format, such as the Web Services Description Language (WSDL). Other systems may interact with the network-based service in a manner prescribed by the description of the network-based service's interface. For example, the network-based service may define various operations that other systems may invoke, and may define a particular application programming interface (API) to which other systems may be expected to conform when requesting the various operations. though In various embodiments, a network-based service may be requested or invoked through the use of a message that includes parameters and/or data associated with the network-based services request. Such a message may be formatted according to a particular markup language such as Extensible Markup Language (XML), and/or may be encapsulated using a protocol such as Simple Object Access Protocol (SOAP). To perform a network-based services request, a network-based services client may assemble a message including the request and convey the message to an addressable endpoint (e.g., a Uniform Resource Locator (URL)) corresponding to the network-based service, using an Internet-based application layer transfer protocol such as Hypertext Transfer Protocol (HTTP).

In some embodiments, network-based services may be implemented using Representational State Transfer ("RESTful") techniques rather than message-based techniques. For example, a network-based service implemented according to a RESTful technique may be invoked through parameters included within an HTTP method such as PUT, GET, or DELETE, rather than encapsulated within a SOAP message.

Although the embodiments above have been described in considerable detail, numerous variations and modifications may be made as would become apparent to those skilled in the art once the above disclosure is fully appreciated. It is intended that the following claims be interpreted to embrace all such modifications and changes and, accordingly, the above description to be regarded in an illustrative rather than a restrictive sense.

What is claimed is:

1. A system comprising:
   at least one processor; and
   a memory storing program instructions that, when executed by the at least one processor, cause the at least one processor to implement a code generation system, the code generation system configured to:
   receive input programming code to perform a next token prediction for the input programming code;
   determine word boundaries with respect to a tokenizer for the input programming code where rightmost boundary contains a partial token, the partial token being used as a prompt suffix;
   identify, from a plurality of tokens, one or more tokens that are a match with the prompt suffix and that start with the prompt suffix or end with the prompt suffix;
   filter next token predictions according to the one or more tokens, wherein the next token predictions are generated by applying a machine learning model, trained to predict next tokens for a programming code, to a remaining portion of the input programming code that does not include a number of backtrack tokens corresponding to a pre-token, wherein the filtering is performed for one or more iterations to remove, after each iteration, one or more characters from left side of the partial token until there are no remaining characters in the partial token, wherein the one or more characters match one of the next token predictions; and
   provide a last one of the next token predictions as the next token prediction for the input programming code.

2. The system of claim 1, wherein to identify, from the plurality of tokens, the one or more tokens that are the match with the partial token, the code generation system is configured to access a trie data structure that stores the plurality of tokens.

3. The system of claim 1, wherein to identify, from the plurality of tokens, the one or more tokens that are the match with the partial token, the code generation system is configured to access a mask cache that stores the plurality of tokens.

4. The system of claim 1, wherein the code generation system is implemented as part of a code development service offered by a provider network, and wherein the input programming code is received as part of a request to generate a code suggestion for a code file received from a client of the provider network.

5. A method comprising:
   receiving, by a text generation system, input text to perform a next token prediction for the input text;
   determining, by the text generation system for the input text, word boundaries with respect to a tokenizer for the input text where rightmost boundary contains a partial token, the partial token being used as a prompt suffix;
   identifying, by the text generation system, from a plurality of tokens one or more tokens, that are a match with the prompt suffix and that start with the prompt suffix or end with the prompt suffix;
   filtering, by the text generation system, next token predictions according to the one or more tokens, wherein the next token predictions are generated by applying a machine learning model, trained to predict next tokens for a text, to a remaining portion of the input text that does not include a number of backtrack tokens corresponding to a pre-token, wherein the filtering is performed for one or more iterations to remove, after each iteration, one or more characters from left side of the partial token until there are no remaining characters in the partial token, wherein the one or more characters match one of the next token predictions; and providing, by the text generation system, a last one of the next token predictions as the next token prediction.

6. The method of claim 5, wherein the identifying, from the plurality of tokens, the one or more tokens that are the match with the partial token comprises accessing a trie data structure that stores the plurality of tokens.

7. The method of claim 6, wherein the trie data structure is used to generate the next token predictions using different machine learning models.

8. The method of claim 5, wherein the identifying, from the plurality of tokens, the one or more tokens that are the match with the partial token comprises accessing a mask cache that stores the plurality of tokens.

9. The method of claim 5, further comprising determining, by the text generation system, the number of backtrack tokens up to a maximum number of backtrack tokens.

10. The method of claim 5, wherein the input text is received as part of a request to provide the next token prediction and wherein the next token prediction is provided as a response to the request.

11. The method of claim 5, wherein the text generation system is implemented as part of an auto completion application.

12. The method of claim 5, wherein the text generation system is implemented as part of a code development service offered by a provider network and wherein the input text is received as part of a request to generate a code suggestion for a code file received from a client of the provider network.

13. One or more non-transitory computer-readable storage media storing program instructions, that when executed on or across one or more computing devices, cause the one or more computing devices to implement:
receiving input text to perform a next token prediction for the input text;
determining word boundaries with respect to a tokenizer for the input text where rightmost boundary contains a partial token, the partial token being used as a prompt suffix;
identifying, from a plurality of tokens, one or more tokens that are a match with the prompt suffix and that start with the prompt suffix or end with the prompt suffix;
filtering next token predictions according to the one or more tokens, wherein the next token predictions are generated by applying a machine learning model, trained to predict next tokens for a text, to a remaining portion of the input text that does not include a number of backtrack tokens corresponding to a pre-token, wherein the filtering is performed for one or more iterations to remove, after each iteration, one or more characters from left side of the partial token until there are no remaining characters in the partial token, wherein the one or more characters match one of the next token predictions; and
providing a last one of the next token predictions as the next token prediction for the input text.

14. The one or more non-transitory computer-readable storage media of claim 13, wherein, in the identifying, from the plurality of tokens, the one or more tokens that are the match with the partial token, the program instructions further cause the one or more computing devices to implement accessing a trie data structure that stores the plurality of tokens.

15. The one or more non-transitory computer-readable storage media of claim 14, wherein the trie data structure is used to generate the next token predictions using different machine learning models.

16. The one or more non-transitory computer-readable storage media of claim 13, wherein, in the identifying, from the plurality of tokens, the one or more tokens that are the match with the partial token, the program instructions further cause the one or more computing devices to implement accessing a mask cache that stores the plurality of tokens.

17. The one or more non-transitory computer-readable storage media of claim 13, storing further program instructions that, when executed on or across the one or more computing devices, cause the one or more computing devices to further implement determining the number of backtrack tokens up to a maximum number of backtrack tokens.

18. The one or more non-transitory computer-readable storage media of claim 13, wherein the input text is received as part of a request to provide the next token prediction and wherein the next token prediction is provided as a response to the request.

19. The one or more non-transitory computer-readable storage media of claim 13, wherein the one or more computing devices are implemented as part of an auto completion application.

20. The one or more non-transitory computer-readable storage media of claim 13, wherein the one or more computing devices are implemented as part of a code development service offered by a provider network and wherein the input text is received as part of a request to generate a code suggestion for a code file received from a client of the provider network.

\* \* \* \* \*